United States Patent [19]
Matsumura et al.

[11] Patent Number: 5,835,144
[45] Date of Patent: Nov. 10, 1998

[54] METHODS OF CODING AND DECODING MOVING-PICTURE SIGNALS, USING SELF-RESYNCHRONIZING VARIABLE-LENGTH CODES

[75] Inventors: Yasuko Matsumura; Toshihisa Nakai, both of Tokyo, Japan

[73] Assignee: Oki Electric Industry Co., Ltd., Tokyo, Japan

[21] Appl. No.: 535,920

[22] Filed: Sep. 28, 1995

[30] Foreign Application Priority Data

Oct. 13, 1994 [JP] Japan ................................. 6-247976

[51] Int. Cl.⁶ .............................. H04N 7/12; H04N 11/02; H04N 11/04
[52] U.S. Cl. ......................... 348/390; 348/347; 348/384
[58] Field of Search ........................ 348/384, 390, 348/397, 399, 405, 408, 407, 409, 411, 438, 423, 469, 398, 410, 421; 386/112

[56] References Cited

U.S. PATENT DOCUMENTS

| | | | |
|---|---|---|---|
| 3,971,888 | 7/1976 | Ching et al. | 348/399 |
| 4,369,463 | 1/1983 | Anastassiou et al. | 348/411 |
| 4,670,890 | 6/1987 | Titchener . | |
| 5,122,875 | 6/1992 | Raychaudhuri et al. | 348/390 |
| 5,168,356 | 12/1992 | Acampora et al. | 348/409 |
| 5,181,229 | 1/1993 | Langlais et al. | 375/365 |
| 5,253,053 | 10/1993 | Chu et al. | 348/384 |
| 5,355,167 | 10/1994 | Juri | 348/405 |
| 5,381,145 | 1/1995 | Allen et al. | 341/107 |
| 5,410,355 | 4/1995 | Kolczynski | 348/438 |
| 5,452,006 | 9/1995 | Auld | 348/390 |
| 5,570,132 | 10/1996 | De With et al. | 348/408 |
| 5,576,765 | 11/1996 | Cheney et al. | 348/407 |

FOREIGN PATENT DOCUMENTS

| | | |
|---|---|---|
| 0 453 229 | 10/1991 | European Pat. Off. . |
| 0 506 294 | 9/1992 | European Pat. Off. . |
| 0 579 075 | 1/1994 | European Pat. Off. . |

OTHER PUBLICATIONS

Video Codec for Audiovisual Services at p x 64 kbits, ITU–T Recommendation H. 261, International Telecommunication Union, Mar. 1993.

Thomas J. Ferguson and Josuha H. Rabinowitz: "Self–Synchronizing Huffman Codes" IEEE Transactions on Information Theory, vol. IT–30, No. 4, pp. 687–693, Jul. 1984.

Yasuhiro Takishima, Masahiro Wada and Hitomi Murakami, "Resynchronization of Variable Length Code" Collected Papers of 1989 Picture Coding Symposium (PCSJ89), pp. 103–104, Oct. 1989.

Patent Abstracts of Japan, vol. 012, No. 310, (E–648) (Aug. 1988) (Abstracts of JP 63 077270 to Takemi).

Patent Abstracts of Japan, vol. 017, No. 699 (P–1665)(Dec. 1993) (Abstract of JP 05 234261 to Ichige).

Patent Abstract of Japan, vol. 016, No. 558 (E–1294) (Nov. 1992) (Abstract of JP 04 213988 to Tadashi).

(List continued on next page.)

Primary Examiner—Douglas W. Olms
Assistant Examiner—David R Vincent
Attorney, Agent, or Firm—Wenderoth, Lind & Ponack, L.L.P.

[57] ABSTRACT

A coded moving-picture signal consists of segments, each having a start code, header information, and coded picture data. The picture data are coded according to a self-resynchronizing variable-length coding rule. During decoding, if an error is recognized, this coding rule is applied in order to resynchronize; the coded data from the resynchronization point up to the next start code are stored in a memory; then the memory contents are decoded. According to a first aspect of the invention, the header information is coded according to the same variable-length coding rule, except for group header information appearing immediately after the start code. According to a second aspect of the invention, the start code is followed by all the header information in the segment, then by all the coded picture data in the segment.

35 Claims, 26 Drawing Sheets

OTHER PUBLICATIONS

P. Kauff et al., *Signal Processing: Image Communication*, vol. 2, No. 2, pp. 221–239 (Aug. 1990).

P. Kauff et al., *Signal Processing of HDTV*, pp. 33–41 (Sep. 1991).

G. Aartsen et al., *Multidimensional Signal Processing*, vol. 2, pp. 1312–1315 (Apr. 1988).

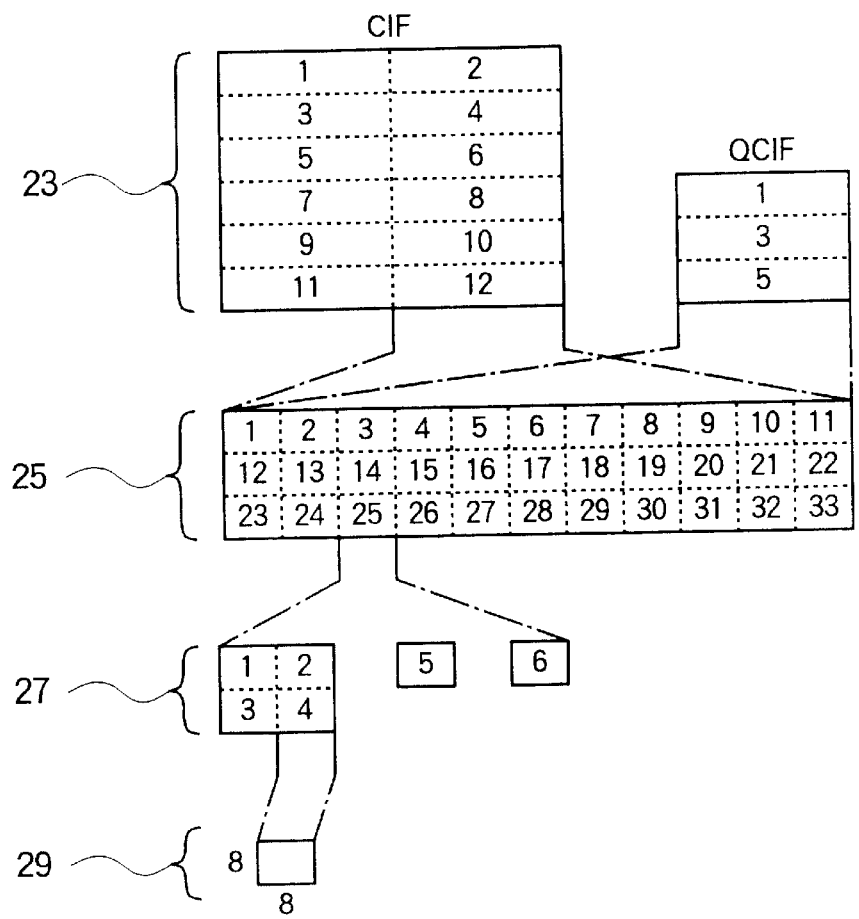

FIG. 5
PRIOR ART
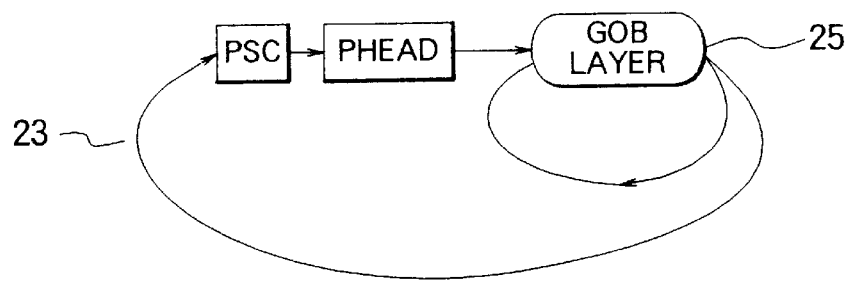
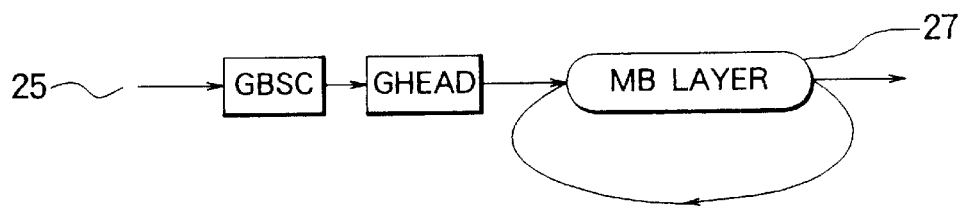
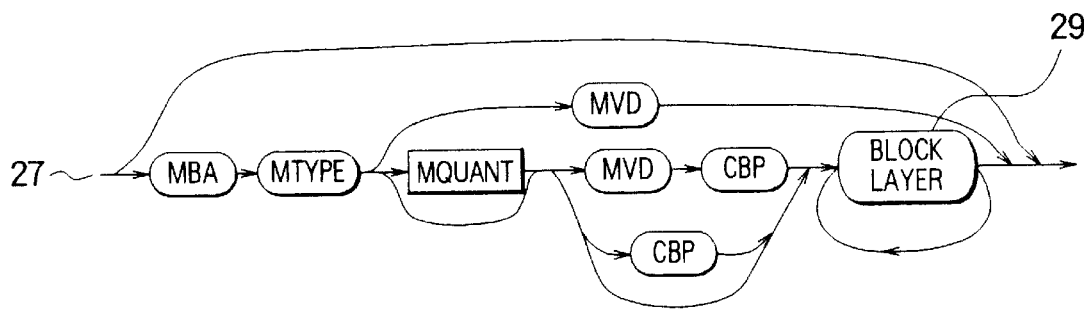

FIG. 6
PRIOR ART

| MBA | CODEWORD |
|---|---|
| 1 | 1 |
| 2 | 011 |
| 3 | 010 |
| 4 | 0011 |
| 5 | 0010 |
| ⋮ | ⋮ |

| MTYPE | CODEWORD |
|---|---|
| INTRA | 0001 |
| INTRA+Q | 0000001 |
| INTER | 1 |
| INTER+Q | 00001 |
| ⋮ | ⋮ |

| MVD | CODEWORD |
|---|---|
| 0 | 1 |
| 1 | 010 |
| -1 | 011 |
| 2 | 0010 |
| -2 | 0011 |
| ⋮ | ⋮ |

| CBP 123456 | CODEWORD |
|---|---|
| 111100 | 111 |
| 000100 | 1101 |
| 001000 | 1100 |
| 010000 | 1011 |
| 100000 | 1010 |
| ⋮ | ⋮ |

| TCOEFF 0-RUN | TCOEFF LEVEL | CODEWORD |
|---|---|---|
| 0 | 1 | 110 |
| 0 | 2 | 0100 |
| 0 | 3 | 001010 |
| 0 | 4 | 00001100 |
| 0 | 5 | 001001100 |
| ⋮ | ⋮ | ⋮ |

FIG. 9

| DATA | | CODEWORD |
|---|---|---|
| MBA (EMBA) | 1<br>2<br>3<br>⋮ | 1<br>011<br>0100<br>⋮ |
| MTYPE | INTRA<br>INTER<br>⋮ | 0001<br>00001<br>⋮ |
| MVD | 0<br>1<br>-1<br>⋮ | 010101<br>0000011<br>0000010<br>⋮ |

FIG. 14
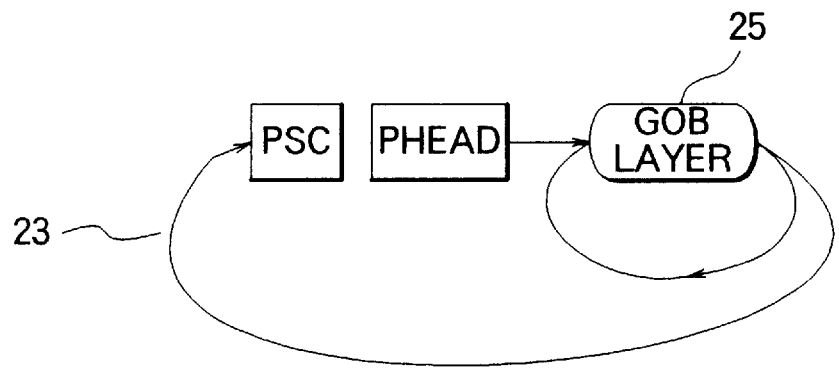
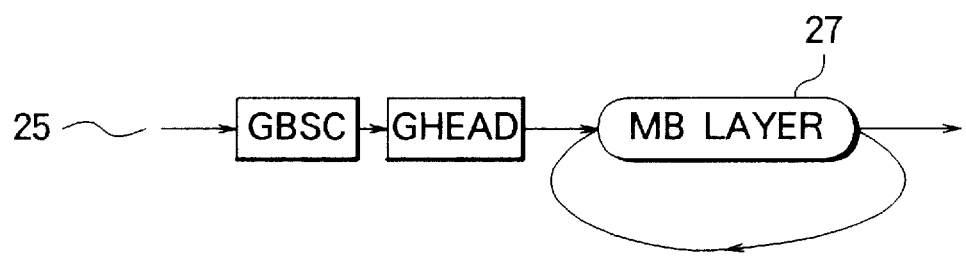
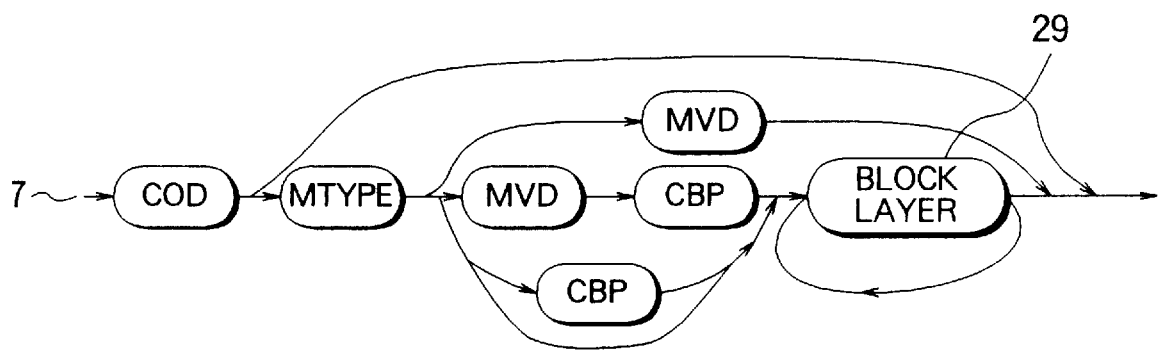

FIG. 15

| DATA | | CODEWORD |
|---|---|---|
| COD | 0 | 1 |
|  | 1 | 011 |
| MTYPE | INTRA | 0001 |
|  | INTER | 001 |
|  | ⋮ | ⋮ |
| MVD | 0 | 010101 |
|  | 1 | 0000011 |
|  | -1 | 0000010 |
|  | ⋮ | ⋮ |

FIG. 19

| CODE-WORD | TCOEFF | | EOMB | MTYPE | CBP | MVD |
|---|---|---|---|---|---|---|
| | 0-RUN | LEVEL | | | 123456 | |
| 111 | — | — | EOMB | — | — | — |
| 110 | EOB | | | INTER (CBP,TCOEFF) | 111100 | 0 |
| 101 | 0 | −1 | | INTER+FIL (MVD,CBP,TCOEFF) | 000100 | −1 |
| 100 | 0 | 1 | | INTER+FIL (MVD) | 001000 | 1 |
| 0111 | 1 | −1 | | INTRA (TCOEFF) | 010000 | −2 |
| 0110 | 1 | 1 | | INTER (MVD,CBP,TCOEFF) | 100000 | 2 |
| 01011 | 2 | −1 | | INTER (MVD) | 001100 | −3 |
| 01010 | 2 | 1 | | | 110000 | 3 |
| 01001 | 0 | −2 | | | 010100 | −4 |
| 01000 | 0 | 2 | | | 101000 | 4 |
| 001111 | 3 | −1 | | | 011100 | −5 |
| 001110 | 3 | 1 | | | 101100 | 5 |
| 001101 | 4 | −1 | | | 110100 | −6 |
| 001100 | 4 | 1 | | | 111000 | 6 |
| 001011 | ESCDC | | | | — | — |
| 000001 | ESC | | | | — | — |
| 0010101 | 0 | −3 | | | 000001 | −7 |
| 0010100 | 0 | 3 | | | 111110 | 7 |
| 0001111 | 5 | −1 | | | 011000 | −8 |
| 0001110 | 5 | 1 | | | 100100 | 8 |
| 0001101 | 6 | −1 | | | 000011 | −9 |
| 0001100 | 6 | 1 | | | 111111 | 9 |
| ⋮ | ⋮ | | | | ⋮ | ⋮ |

FIG. 24

| CODE-WORD | TCOEFF | | MTYPE | CBP | MVD |
|---|---|---|---|---|---|
| | 0-RUN | LEVEL | | 123456 | |
| 10 | EOB, ESCDC | | — | — | — |
| 111 | 0 | −1 | INTER (CBP,TCOEFF) | 111100 | 0 |
| 110 | 0 | 1 | INTER+FIL (MVD,CBP,TCOEFF) | 000100 | −1 |
| 0111 | 1 | −1 | INTER+FIL (MVD) | 001000 | 1 |
| 0110 | 1 | 1 | INTRA (TCOEFF) | 010000 | −2 |
| 01011 | 2 | −1 | INTER (MVD,CBP,TCOEFF) | 100000 | 2 |
| 01010 | 2 | 1 | INTER (MVD) | 001100 | −3 |
| 01001 | 0 | −2 | | 110000 | 3 |
| 01000 | 0 | 2 | | 010100 | −4 |
| 001111 | 3 | −1 | | 101000 | 4 |
| 001110 | 3 | 1 | | 011100 | −5 |
| 001101 | 4 | −1 | | 101100 | 5 |
| 001100 | 4 | 1 | | 110100 | −6 |
| 001011 | 0 | −3 | | 111000 | 6 |
| 001010 | 0 | 3 | | 000001 | −7 |
| 000001 | ESC | | | — | — |
| 0001111 | 5 | −1 | | 111110 | 7 |
| 0001110 | 5 | 1 | | 011000 | −8 |
| 0001101 | 6 | −1 | | 100100 | 8 |
| 0001100 | 6 | 1 | | 000011 | −9 |
| ⋮ | ⋮ | ⋮ | | ⋮ | ⋮ |

METHODS OF CODING AND DECODING MOVING-PICTURE SIGNALS, USING SELF-RESYNCHRONIZING VARIABLE-LENGTH CODES

BACKGROUND OF THE INVENTION

The present invention relates to methods of coding and decoding moving-picture data, more particularly to methods that employ self-resynchronizing variable-length codes to reduce data loss when an error occurs.

A hierarchical coding scheme that employs a plurality of variable-length coding rules has been recommended by the International Telecommunication Union (ITU-T Recommendation H.261, approved March 1993). This scheme, henceforth referred to as the prior art, divides the video data stream into segments corresponding to, for example, groups of picture areas, and employs a start code to identify the beginning of each segment. Further details of the prior art will appear in the description of the invention.

A problem with variable-length codes in general, and with this prior art in particular, is that when an error occurs in the transmission of data, the decoder may mistake the length of the codeword in error, thereby losing synchronization with the variable-length coding rule. In the above prior art such loss of synchronization can lead to extended mistakes in decoding codewords following the point of the error. Synchronization is not reliably regained until the next start code is recognized.

Because incorrectly decoded data could cause highly visible image defects, when an error is recognized, all data from the point of the error up to the next start code are conventionally replaced by data from the previous frame in the moving-picture sequence. Due to the use of motion compensation and inter-frame prediction, however, this wholesale substitution of data from one frame into the next has effects that can propagate into succeeding frames, leading to persistent and noticeable image degradation.

It would be desirable to reduce data substitution through the use of self-resynchronizing variable-length codes. Such codes are well known, but the prior art is not well adapted for their use, for reasons that will be given later.

SUMMARY OF THE INVENTION

It is accordingly an object of the present invention to keep errors in variable-length codes from causing coded moving-picture data to be unnecessarily discarded.

According to a first aspect of the invention, part of a source signal representing a moving picture is coded according to one or more fixed-length coding rules, and the rest of the source signal is coded according to a single, self-resynchronizing, variable-length coding rule, thereby generating variable-length codewords. The resulting coded signal is segmented by start codes. During decoding, if an error is recognized, the self-resynchronizing variable-length coding rule is applied to resynchronize, then the coded data up to the next start code are stored in a memory. The memory contents are decoded after that next start code has been detected.

According to a second aspect of the invention, the source signal is coded so as to output a start signal, followed by header information pertaining to a plurality of picture areas, then followed by coded picture data pertaining to the same plurality of areas. The picture data are coded according to a single, self-resynhronizing, variable-length coding rule. In decoding, the header information is stored in a memory. If an error is recognized, the variable-length coding rule is applied to resynchronize, then the coded picture data up to the next start code are also stored in the memory. The memory contents are decoded after the next start code has been detected, with reference to the stored header information.

BRIEF DESCRIPTION OF THE DRAWINGS

FIG. 2 illustrates a hierarchical division of moving-picture data.

FIG. 3 illustrates the coding sequence of transform coefficients for one block of moving-picture data.

FIG. 5 illustrates the video multiplex coding syntax in the prior art.

FIG. 6 illustrates variable-length coding tables employed in the prior art.

FIG. 9 illustrates part of the self-resynchronizing variable-length coding table employed in the first embodiment.

FIG. 14 illustrates the video multiplex coding syntax in the second embodiment.

FIG. 15 illustrates part of the self-resynchronizing variable-length coding table employed in the second embodiment.

FIG. 19 illustrates part of the self-resynchronizing variable-length coding table employed in the third embodiment.

FIG. 24 illustrates part of the self-resynchronizing variable-length coding table employed in the fourth embodiment.

DETAILED DESCRIPTION OF THE INVENTION

Embodiments of the invented coding and decoding methods will be described with reference to the attached illustrative drawings. First, however, a short description will be given of a video coder-decoder (codec), and of the coding method of the prior art.

Figure 1:
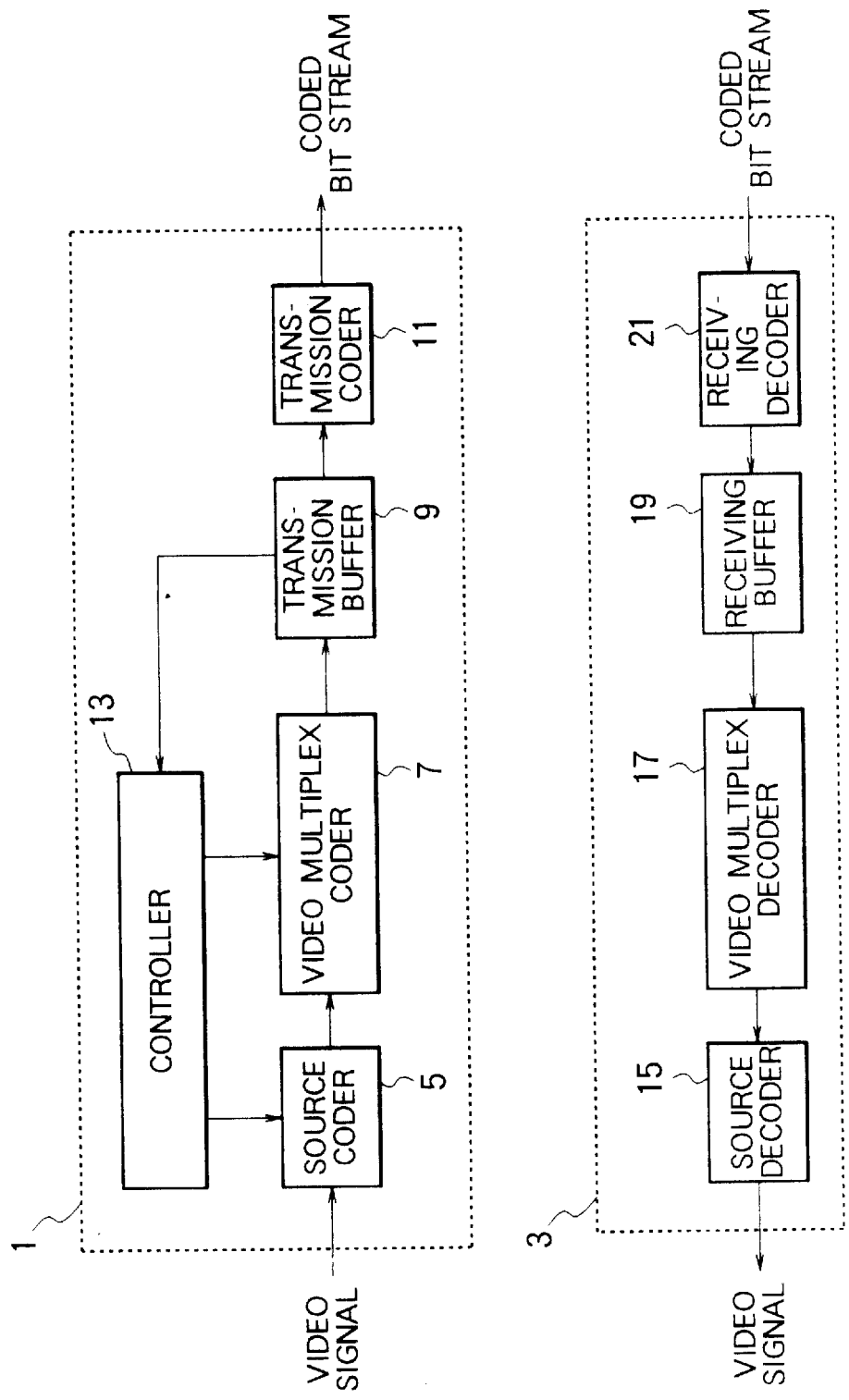
FIG. 1 is a block diagram of a video coder and decoder.

FIG. 1 is a block diagram of a video codec as described in the above-mentioned Recommendation H.261, and is shown as an example of the type of apparatus in which the invention can be applied. The codec consists of a video coder 1, which converts a digital video signal to a coded bit stream, and a video decoder 3, which performs the reverse function. The video coder 1 comprises a source coder 5, video multiplex coder 7, transmission buffer 9, transmission coder 11, and controller 13. The video decoder 3 comprises a source decoder 15, video multiplex decoder 17, receiving buffer 19, and receiving decoder 21.

The source coder 5 compresses the digital video signal by a variety of well-known methods, including inter-frame prediction, motion compensation, the discrete cosine transform, and quantization. The video multiplex coder 7 further compresses the output of the source coder 5 by zigzag run-length encoding and variable-length encoding, and adds header information, start codes, and other auxiliary information, as described later. The transmission buffer 9 stores the output of the video multiplex coder 7 prior to transmission. The transmission coder 11 frames the data in the buffer 9 for transmission over a communication channel, adds error-correcting codes, adds dummy data as necessary, and outputs the coded bit stream. The controller 13 observes the amount of data in the transmission buffer 9 and controls the source coder 5 and video multiplex coder 7 so as to prevent buffer overflow. The source decoder 15, video multiplex decoder 17, and receiving decoder 21. perform processing reverse to that of the source coder 5, video multiplex coder 7, and transmission coder 11, respectively.

Referring to FIG. 2, the video signal received by the video coder 1 in FIG. 1 has either the standard common intermediate format (CIF) or quarter common intermediate format (QCIF). Both formats employ a hierarchy having four levels, referred to as layers: a picture layer 23, a group-of-blocks layer 25, a macroblock layer 27, and a block layer 29. The two formats differ only at the picture level 23, a CIF picture consisting of twelve groups of blocks while a QCIF picture consists of three.

Each group of blocks 25 is a rectangular array of thirty-three macroblocks. The spatial position of each macroblock in the group is identified by a macroblock address, which is an integer from one to thirty-three as shown in the drawing.

Each macroblock 27 consists of four luminance blocks (blocks one to four) and two chrominance blocks (blocks five and six). The luminance sampling density is twice that of the chrominance sampling density, so each of the two chrominance blocks covers the same picture area as the four luminance blocks combined.

A block 29 is an eight-by-eight array of luminance or chrominance values, corresponding to a square picture area with sixty-four luminance or chrominance picture elements.

The numbering in FIG. 2 indicates the sequences of the the groups of blocks 25, macroblocks 27, and blocks 29 in the data stream. Blocks 29 and macroblocks 27 with no data may be omitted from the data stream, as described later.

FIG. 3 shows the structure of one block 30 of luminance or chrominance data after execution of the discrete cosine transform in the source coder 5. The sixty-four data values are transform coefficients in the spatial frequency domain. The horizontal axis of the block represents horizontal spatial frequency and the vertical axis represents vertical spatial frequency, with frequency increasing in the right and down directions. The first transform coefficient (numbered one in the drawing) is a so-called dc coefficient, representing the average signal level in the block.

When the sixty-four transform coefficients of one block are coded by the video multiplex coder 7, they are taken in the zigzag order indicated by the numbering in FIG. 3, so that lower-frequency coefficients are coded first. Due to prediction and quantization, most of the coefficients are usually zero, so instead of coding each coefficient value individually, the coder codes the length of each run of zeros and the value of the -following non-zero coefficient.

Figure 4:
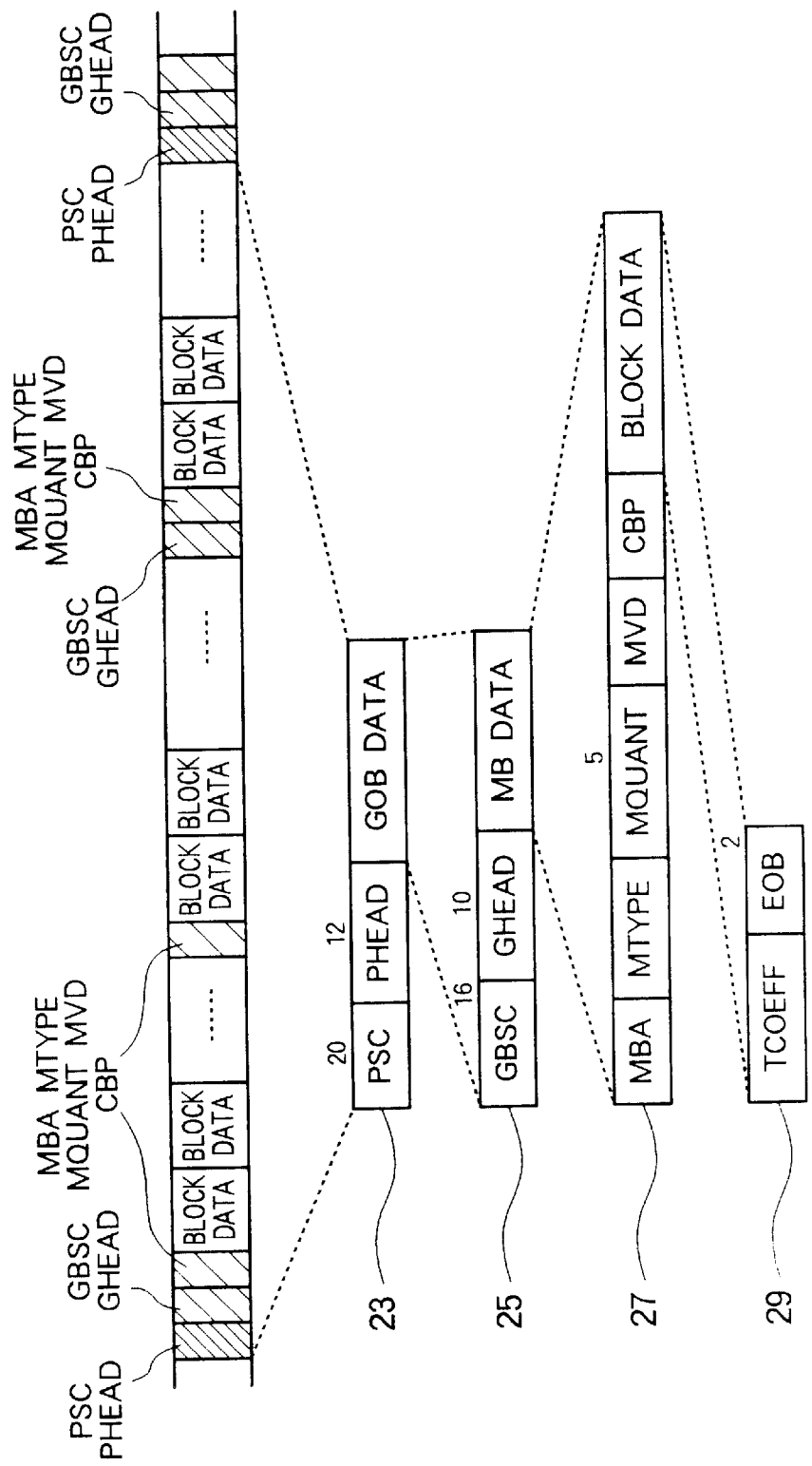
FIG. 4 illustrates the general structure of the coded data stream in the prior art.

FIG. 4 shows the general structure of the data stream output by the video multiplex coder 7 in the prior art. The bit lengths of fixed-length items are indicated by numbers over the items. FIG. 5 shows the coding syntax, with fixed-length items enclosed in boxes with square corners and variable-length items in boxes with rounded corners. Table 1 lists the meanings of the abbreviations used in these and subsequent drawings.

TABLE 1

| Abbreviations | |
|---|---|
| CBP | Coded block pattern |
| EOB | End of block |
| GBSC | GOB start code |
| GHEAD | GOB header |
| GOB | Group of blocks |
| MB | Macroblock |
| MBA | Macroblock address |
| MQUANT | Macroblock quantizer |
| MTYPE | Macroblock type |
| MVD | Motion vector data |
| PHEAD | Picture header |
| PSC | Picture start code |
| TCOEFF | Transform coefficients |

The picture and GOB start codes PSC and GBSC are the following bit strings, which can be unambiguously recognized by the video multiplex decoder 17. The term "start code" hereinafter will refer to either of these start codes.

| PSC: | 0000 0000 0000 0001 0000 |
|---|---|
| GBSC: | 0000 0000 0000 0001 |

The picture header (PHEAD) is a fixed-Length item that contains various information pertaining to a picture as a whole, such as whether the picture format is CIF or QCIF. The GOB header (GHEAD) is a fixed-length item that contains information pertaining to one group of blocks, such as the group number and the initial quantization step size. The MBA, MTYPF, MQUANT, MVD, and CBP items, referred to collectively as a macroblock header, specify information pertaining to a macroblock, as follows.

MBA is a variable-length item that indicates the macroblock address. Address information is necessary because macroblocks having no data to be coded are omitted from the coded data stream. The address coding scheme is differential. The address of the first macroblock in the GOB that is actually present in the data stream is given as an integer from one to thirty-three, as in FIG. 2. For other macroblocks, the difference between the macroblock address and the preceding macroblock address is given.

MTYPE is a variable-length item that indicates, first of all, whether the macroblock was coded by the source coder 5 in the intra or inter mode. Intra mode means that the actual luminance and chrominance values were coded. Inter mode means that these values were predicted, then the prediction error was encoded. For the inter mode, MTYPE also indicates whether or not motion compensation and a loop filter were applied in the prediction process. Finally, MTYPE indicates which of the other macroblock header items are present, and whether or not block data are present.

Incidentally, the source coder 5 decides whether to use intra or inter mode according to picture statistics, such as the variances of the prediction error data and the source data. Intra mode is typically employed at scene changes, and may also be employed at regular intervals to prevent accumulation of decoding errors.

MQUANT is a fixed-length item that identifies the quantization step size used in quantizing the transform coefficients, other than the dc coefficients, in the macroblock, if this step size differs from the step size in the preceding macroblock.

MVD is a variable-length item that specifies the horizontal and vertical components of the motion vector of the macroblock.

CBP is a variable-length item that indicates which of the six blocks in the macroblock contain any non-zero data. Blocks consisting entirely of zero data are omitted from the coded data stream.

In the block layer 29, TCOEFF represents either a fixed-length dc coefficient in an intra block, or a combination of a zero run length and a non-zero coefficient value, as described above. Variable-length codewords are provided for the most common combinations. Other combinations are coded as a six-bit escape code followed by a six-bit run-length value and an eight-bit coefficient value.

EOB is a two-bit end-of-block code placed at the end of every coded block. EOB has the binary value "10" and can be regarded as a type of TCOEFF codeword, distinguishable from the other TCOEFF codewords by the variable-length coding rule.

In the syntax diagrams in FIG. 5, loops are repeated until the relevant data are exhausted. In the GOB layer 25, for example, following GHEAD, the macroblock (MB) layer 27 is repeated once for each macroblock containing any data, and hence may be repeated up to a maximum thirty-three times.

In the macroblock Layer 27, the syntax following MTYPE varies depending on the type of macroblock. Intra macroblocks, for example, lack the MVD and CBP items, and always contain block data for all six constituent blocks. An inter macroblock may have motion vector data (MVD) but no block data, hence no MQUANT or CBP items. For inter macroblocks having block data, the CBP item indicates which blocks are present, and the block layer 29 is repeated once for each of these blocks.

FIG. 6 shows part of the variable-length coding tables for MBA, MTYPE, MVD, CBP, and TCOEFF in the prior art. A different variable-length coding rule is used for each of these items.

A variable-length length coding rule is an algorithm that determines where one variable-length ends and the next variable-length codeword begins. The algorithm can be expressed as a tree diagram; details are omitted, as these tree diagrams will be familiar to those skilled in the variable-length coding art.

To point out just one of the differences in coding rules in FIG. 6, the CBP code uses the codeword "111" to indicate a macroblock with block data for blocks one to four (the luminance blocks) and no block data for blocks five and six (the chrominance blocks). This codeword "111" does not appear in the coding tables for any of the other items. Instead, the one-bit codeword "1" is used, with different meanings, in the MBA, MTYPE, and MVD codes. Thus "111" would be decoded as a single codeword in the CBP code, but as three instances of the codeword "1" in the MBA, MTYPE, and MVD codes.

Another difference is the following: "001001100," which is a single codeword in the TCOEFF code, would be interpreted in the MBA code as two codewords "0010" and "011" and the first two bits of another codeword, possibly "0011" or "0010." Incidentally, in the MITYPE coding table, "+Q" indicates a macroblock with a new quantization step size, specified by the MQUANT item.

Use of variable-length coding rules specially tailored to specific items permits the average code length to be reduced. It does not, however, promote rapid recovery from errors, because once variable-length code synchronization is lost, in attempting to resynchronize, the video multiplex decoder 17 cannot be sure which variable-length coding rule to apply. This is one reason why the the prior art is not well suited to take advantage of self-resynchronizing codes.

Another reason is the appearance of fixed-length items, such as the MQUANT item, and dc coefficients of intra blocks, among the variable-length items. If the decoder 17 loses synchronization it may attempt to apply a variable-length decoding rule to part of a fixed-length item, with undesirable results.

Still another reason is that if any MQUANT item is lost, the quantization step size in the current macroblock and possibly subsequent macroblocks will be unknown.

Yet another reason is the differential coding of macroblock addresses. Even if the decoder 17 were able to resynchronize after an error, if even one MBA value had been lost, the addresses of all subsequent macroblocks in the group of blocks would be uncertain. Although these macroblocks could be decoded, they could not be placed at their correct locations in the group.

In the prior art, accordingly, when the decoder 17 finds an error, it usually has no choice but to wait for the appearance of the start code of the next group of blocks, or next picture, and resume decoding from there.

A first embodiment of the invention will now be described with reference to FIGS. 7 to 12. The same general codec structure and hierarchical data structure as shown in FIGS. 1 to 3 will be assumed. Hierarchical layers will be identified by the same reference numerals as in FIG. 2.

Figure 7:
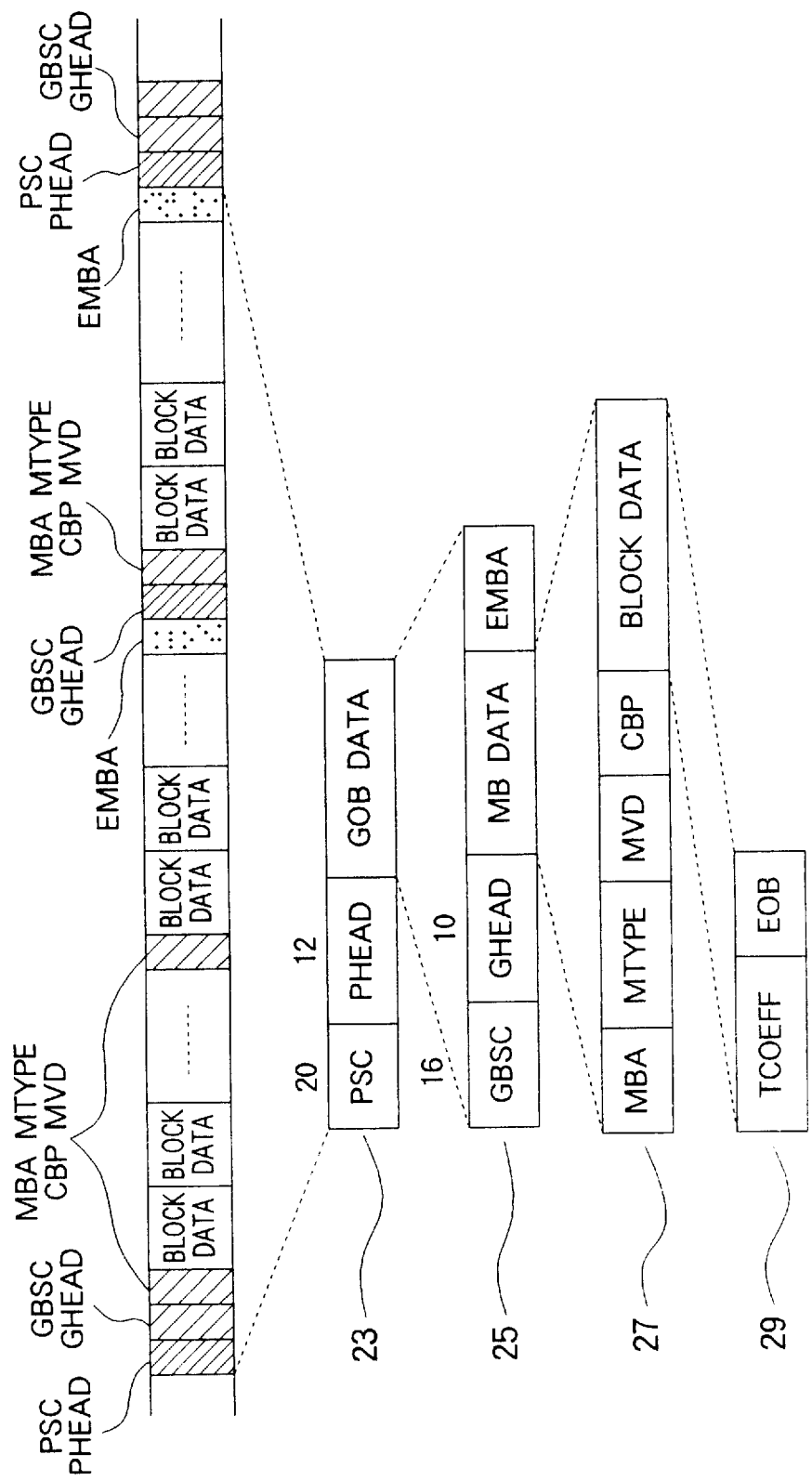
FIG. 7 illustrates the general structure of the coded data stream in a first embodiment of the invention.

FIG. 7 shows the general structure of the data stream output by the video multiplex coder 7 according to the first embodiment. This structure is derived from the structure in FIG. 4 by omitting the MQUANT item from the macroblock header information, and adding a novel ending macroblock address EMBA after the macroblock (MB) data in each group of blocks 25. EMBA is a variable-length codeword representing an integer from one to thirty-three, giving the absolute position of the last macroblock in the group of blocks for which any other codewords were generated (the last macroblock present in the data coded stream).

As in the prior art, the MBA codewords represent differential addresses, giving differences between positions of the corresponding macroblocks. The first MBA codeword in a group of blocks represents the absolute position of the first macroblock in the group of blocks for which any codewords appear. The other MBA codewords represent the difference between the position of the corresponding macroblock and the position of the first preceding macroblock for which any codewords appear. The MBA codewords represent relative positions of the macroblocks, except for the first macroblock.

Descriptions of other items in FIG. 7 will be omitted as they are the same as in FIG. 4.

Figure 8:
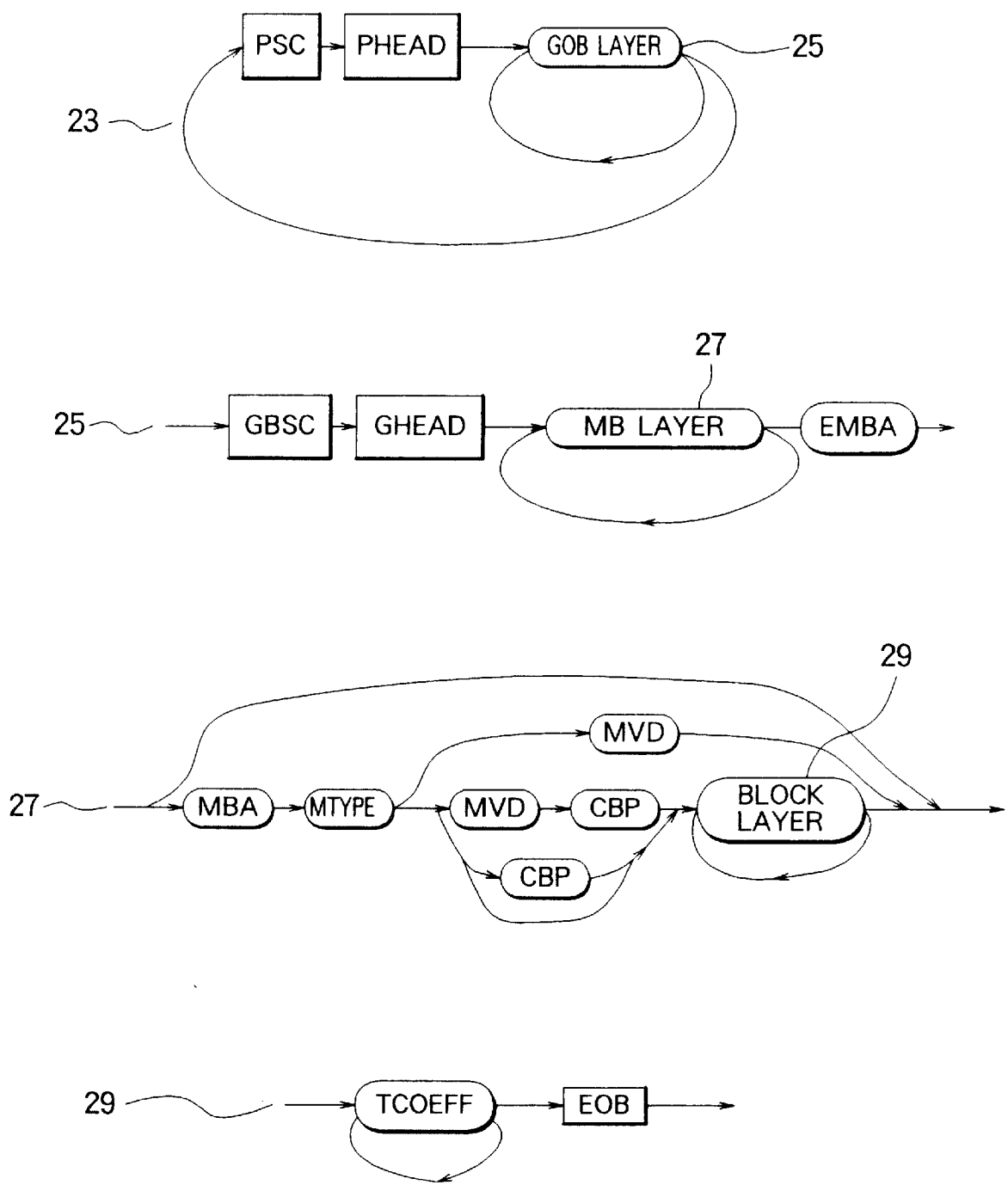
FIG. 8 illustrates the video multiplex coding syntax in the first embodiment.

FIG. 8 shows the video multiplier coding syntax of the first embodiment. The differences from FIG. 5 are that EMBA has been added at the end of the coding syntax of the GOB layer 25, and MQUANT has been removed from the coding syntax of the macroblock layer 27. Otherwise, the coding syntax is the same as in FIG. 5.

FIG. 9 shows part of the variable-length coding table employed in the first embodiment. Differing from the prior art, the first embodiment uses a single variable-length code that covers all the variable-length items: MBA, EMBA, MTYPE, MVD, CBP, and TCOEFF. Basically, each codeword belongs to a unique one of these items, and does not represent any values of any other items. The one-bit codeword "1" for example represents an MBA value of one, and does not represent any MTYPE, MVD, CBP, or TCOEFF value.

As an exception to this uniqueness principle, MBA and EMBA values are coded with the same codewords, representing integers from one to thirty-three. Notwithstanding this exception, all variable-length coding is carried out within the same coding rule, so in decoding, there is never any question as to what rule to apply to identify boundaries of variable-length codewords.

Although not shown in FIG. 9, one codeword in the variable-length coding table is assigned to the end-of-block code EOB, even though EOB is shown as a fixed-length item in FIG. 8. The variable-length coding table in FIG. 9 is accordingly used to code all items in the macroblock and block layers 27 and 29 of the coding syntax in FIG. 8.

A further feature of the coding rule of the first embodiment is that the code is self-resynchronizing. This is a statistical property, meaning that if the decoder loses synchronization but keeps on decoding anyway, it will recover synchronization, and the average time until recovery of synchronization will be short. Put differently, if a data stream is coded by a self-resynchronizing variable-length coding rule, then decoded starting from a random bit position, although a few false or illegal codewords may be found at first, the rule will soon start identifying codeword boundaries correctly and producing valid output.

One known way to construct a self-resynchronizing variable-length code is to maximize the number of instances in which one codeword appears as a terminal sequence (suffix) of another codeword. Two examples in FIG. 9 are the reappearance of the codeword "011" (MBA=2) as the terminal sequence of the codeword "0000011" (MVD)=1), and the reappearance of the codeword "0001" (INTRA) as the terminal sequence of the codeword "00001" (INTER).

The fixed-length items in FIGS. 7 and 8, namely the picture and GOB headers PHEAD and GHEAD and start codes, can be encoded in the same way as in the prior art. The variable-length coding table of the first embodiment is constructed so as to exclude the start codes: neither start code is mistakable for any possible combination of variable-length codewords.

Next the coding and decoding operations in the first embodiment will be described.

Referring again to FIG. 1, in the coding operation, the source coder 5 carries out prediction, motion compensation, discrete cosine transform, and quantization processes on the input video signal, under direction of the controller 13. A single quantization step size is used for all macroblocks in each group of blocks. The output of the source coder 5 consists of various types of digital information items, coded according to a variety of fixed-length coding rules.

The video multiplex coder 7 leaves some of the fixed-length items output by the source coder 5 in fixed-length form, and converts the rest to variable-length codewords, using the variable-length coding table shown in FIG. 9. It also adds start codes, ending macroblock addresses, end-of-block codes, and generates header information as called for by the coding syntax in FIG. 8. The header of each group of blocks specifies the quantization step size used throughout that group of blocks. The quantization step size is one of the codewords Left in fixed-length format.

If necessary, the video multiplex coder 7 may add dummy data at the command of the controller 13, to maintain a minimum bit rate, or discard data (such as high-frequency coefficient data) to avoid overflow of the transmission buffer 9. The data stream output from the video multiplex coder 7 is stored temporarily in the transmission buffer 9, then framed for transmission by the transmission coder 11, with addition of appropriate error-correcting codes.

In the decoding operation, the receiving decoder 21 deframes the incoming coded bit stream, detects and corrects errors within the extent of its capability, and stores the resulting data stream in the receiving buffer 19. Despite error correction by the receiving decoder 21, errors may still remain, detected or otherwise, in the data in the receiving buffer 19.

To decode the data stream in the receiving buffer 19, the video multiplex decoder 17 searches for start codes in the data stream. When it finds a start code, it follows the procedure illustrated in FIG. 10.

If the start code is a picture start code (PSC), the decoder 17 separates and stores the picture header (PHEAD), cheeks the GOB start code GBSC, and stores the GOB header (GHEAD). If the start code is a GBSC, the GOB header is separated and stored (step A1 in FIG. 10).

In either case, the decoder 17 now finds itself at the beginning of the variable-length data in a group of blocks, and commences decoding according to the coding syntax and table in FIGS. 8 and 9. This decoding process includes variable-length decoding, run-length decoding, reconstruction of absolute macroblock addresses from the differentially encoded values, and other processes that produce properly-identified blocks of sixty-four transform coefficients each (still in step A1).

While decoding the variable-length data, the video multiplex decoder 17 checks for errors (step A2). Errors may have been flagged by the receiving decoder 21, but the video multiplex decoder 17 can also recognize errors on its own, e.g. from the presence of a codeword in the wrong location, such as a codeword other than an MBA codeword at the beginning of a macroblock header; from the presence of an illegal codeword (not found in the coding table); or from the presence of more than sixty-four transform coefficients in one block.

If an error is recognized, the video multiplex decoder 17 stops decoding and attempts to resynchronize (step A3). Specifically, it begins scanning the data stream forward from the current position, taking data bit by bit from the receiving buffer 19, and checking for agreement with the coding syntax in FIG. 8 and coding table in FIG. 9.

When the scan has proceeded far enough for the video multiplex decoder 17 to decide whether synchronization has been recovered or not, the decoder 17 makes this decision (step A4). If synchronization has not been recovered, the decoder 17 returns to step A3 and continues scanning. If synchronization has been recovered, the decoder 17 identifies the point at which synchronization was recovered, referred to below as the resynchronization point, and proceeds to the next step.

In this next step (step A5), the decoder 17 continues taking data, which it can now divide correctly into variable-length codewords, from the receiving buffer 19. Starting from the resynchronization point, these variable-length codewords are stored in a special memory area, referred to below the GOB memory because it has enough capacity to store one group of blocks. Each codeword is stored at a separate address in the GOB memory.

As the decoder 17 continues taking and storing variable-length codewords, it looks for another start code (step A6). The storing of codewords in the GOB memory (step A5) continues as long as the decoder 17 does not detect a start code.

When a start code is detected, the codewords stored in the GOB memory are decoded (step A7). Details of this step will be given separately below.

After the data stored in the GOB memory have been decoded, these data are output to the source decoder 15 (step A8), together with the variable-length data decoded in step A1 before the error was found, and the fixed-length header information stored in step A1.

After completing the output of one group of blocks, the decoder 17 returns to step A1 to decode the next group of blocks. If input has ended and there is no next group of blocks, decoding terminates (step A9).

Upon receiving header information and transform coefficient data from the video multiplex decoder 17, the source decoder 15 dequantizes the transform coefficients according to the step size specified in the header information, then performs an inverse discrete cosine transform and other processes such as motion Compensation to produce a video output signal. If an error occurred in variable-length decoding, the source decoder 15 replaces entire macroblocks from the point of the error up to the resynchronization point with the equivalent macroblocks from the previous frame in the moving-picture sequence.

Next step A7 will be described in more detail. In this first embodiment, step A7 consists of steps C1 to C10 in FIG. 11. The symbol MBA in FIG. 11 denotes a differential macroblock address, as obtained by variable-length decoding of the MBA item. The symbol MBA(i) indicates an absolute macroblock address, i.e. an integer from one to thirty-three as shown in FIG. 2.

Figure 10:
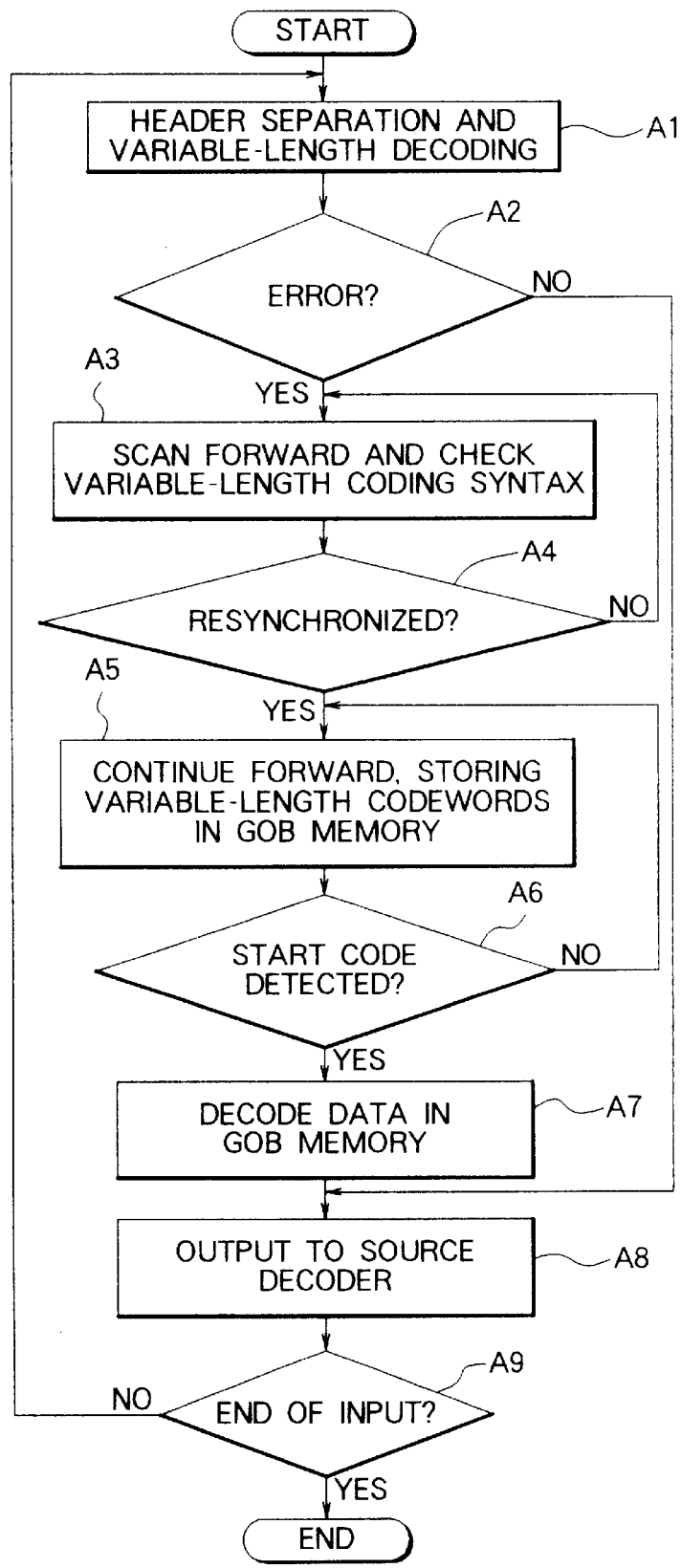
FIG. 10 is a general flowchart of the decoding process according to the invention.
Figure 11:
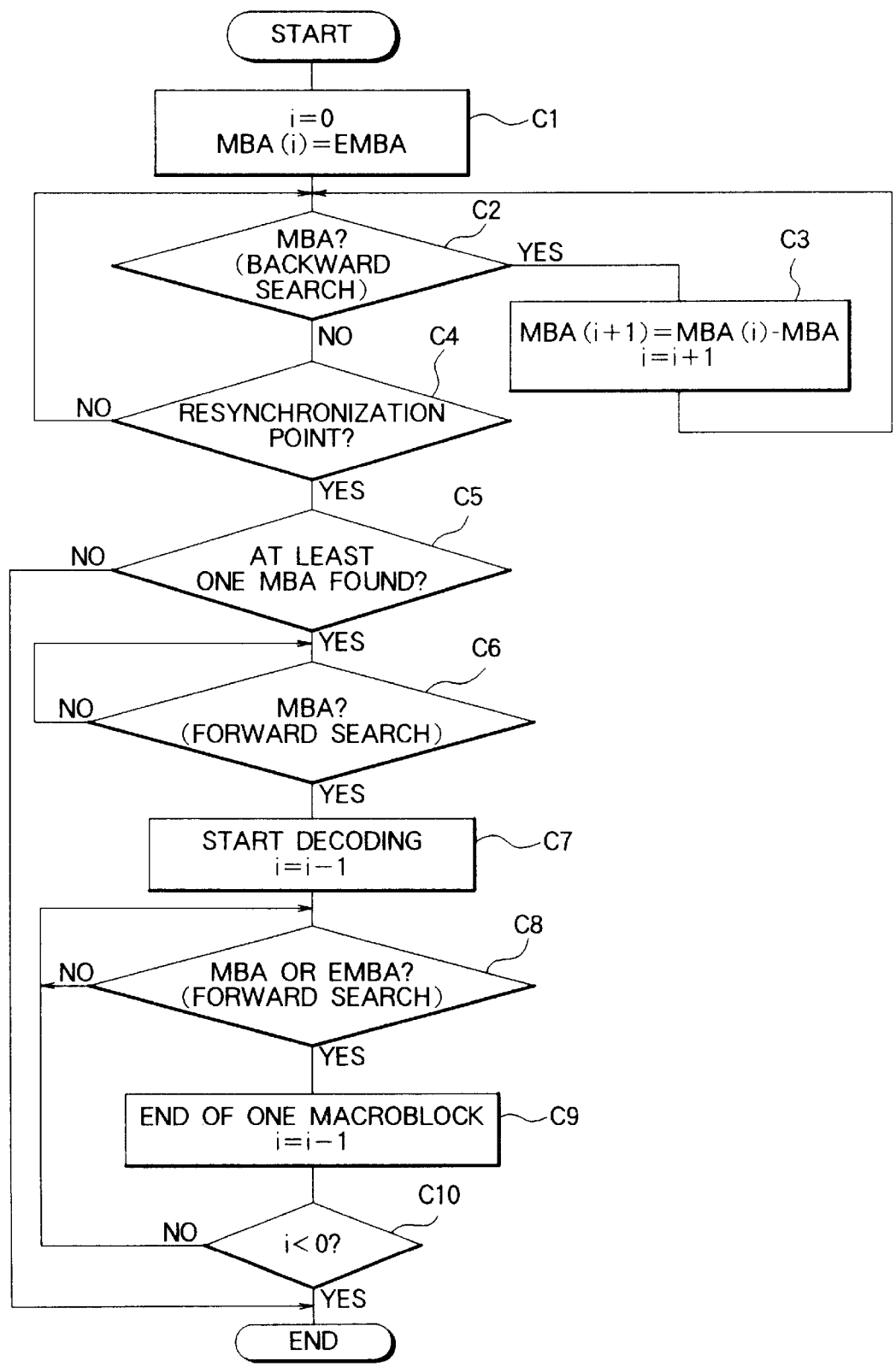
FIG. 11 is a more detailed flowchart of the decoding of memory contents in the first embodiment.

In step C1 in FIG. 11, a parameter i is set to zero, and the EMBA codeword, which was the last codeword stored in the GOB memory before detection of the start code in step A6 in FIG. 10, is fetched from the GOB memory and decoded. The decoded value of the EMBA codeword is assigned as MBA(i); that is, as MBA(0).

The preceding codeword in the GOB memory is then examined to see if it is an MBA codeword.

If this codeword is an MBA codeword, it is decoded to obtain a differential macroblock address MBA; this differential address is subtracted from MBA(i) and assigned as MBA(i+1); then the parameter i is incremented by one, and a return is made to step C2 to continue searching backward for MBA codewords (step C3).

If the codeword examined in step C2 is not an MBA codeword, and if the resynchronization point has not yet been reached, step C2 is repeated to continue searching backward in the GOB memory. When the resynchronization point is reached, this backward search ends (step C4).

If the decoder 17 reaches the resynchronization point without finding any MBA codeword in the GOB memory, the decoding process for this group of blocks ends (step C5).

Otherwise, the decoder 17 reverses direction and starts searching forward from the resynchronization point for the first MBA codeword stored in the GOB memory (step C6).

When this first MBA codeword is reached, the decoder 17 decrements the parameter i by one and commences variable-length decoding and run-length decoding of the rest of the data stored in the GOB memory, working forward toward the end of the group of blocks (step C7).

As each variable-length codeword is decoded, it is checked to see whether it is an MBA or EMBA codeword (step C8). If it is not, the next codeword is decoded.

When an MBA or EMBA codeword is reached, the decoder assigns the data decoded since the Last MBA codeword as the data for the macroblock with address MBA(i), then decrements the parameter i by one (step C9). Depending on the macroblock type, the decoded macroblock data include the macroblock address, up to six blocks of sixty-four transform coefficients each, a fixed-length coded block pattern identifying these blocks, and/or motion vector data.

If the parameter i is now negative, the GOB memory is initialized and multiplex decoding of the group of blocks ends (step C10). Otherwise, a return is made to step C8 to decode the next macroblock.

Figure 12:
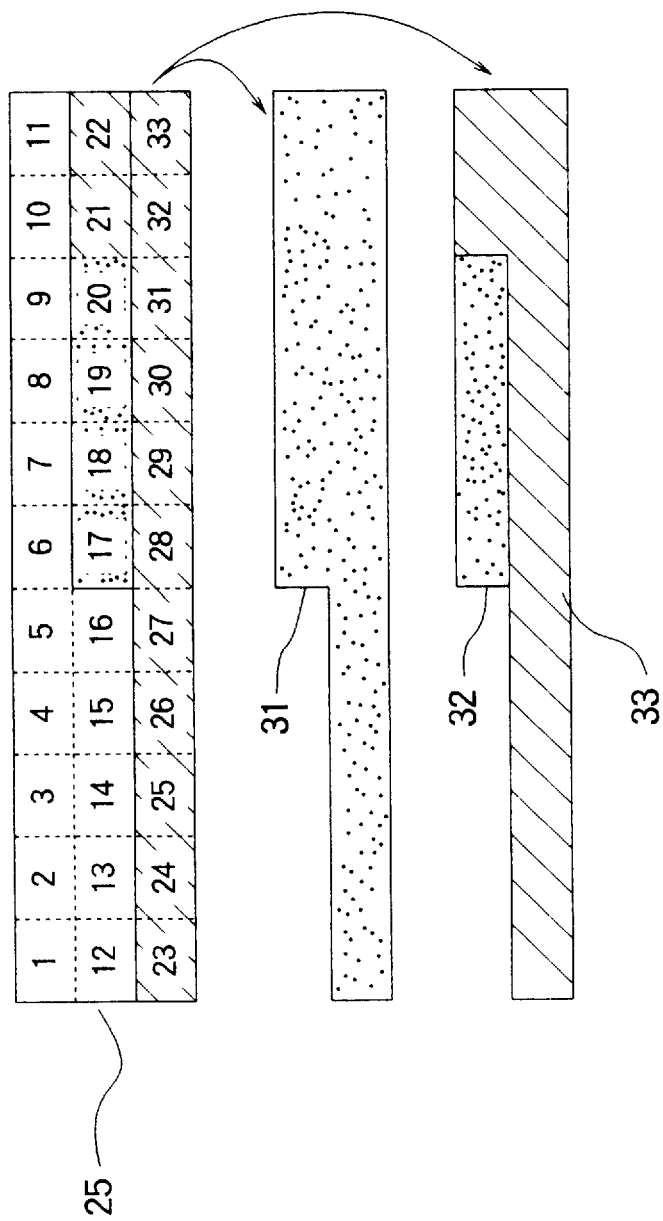
FIG. 12 compares typical data loss due to an error in the prior art and in the first embodiment.

FIG. 12 compares the effect of the first embodiment with the prior art when an error occurs in the middle of a group of blocks 25. The error is assumed to occur in the seventeenth macroblock, and synchronization to be recovered in the twentieth macroblock. In the prior art, data 31 consisting of all macroblocks from the seventeenth to the thirty-third must be discarded. In the first embodiment, however, only data 32 consisting of the seventeenth to twentieth macroblocks are discarded; the data 33 in macroblocks twenty-one to thirty-three are decoded and sent to the source decoder 15. In this hypothetical case the first embodiment produces less than one-fourth as much picture degradation due to data substitution as does the prior art.

Owing to the resynchronizing properties of the variable-length coding rule, resynchronization tends to occur quickly in the first embodiment. The resynchronization process is greatly facilitated because a single coding rule applies to all items in the macroblock and block layers, including the end-of-block codes (EOB). The variable-length code stream is not interrupted by fixed-length codes such as the MQUANT code in the prior art.

For these reasons, if an error is confined to one macroblock, resynchronization will often occur in the same or the next macroblock, causing the first embodiment to lose only one or two macroblocks of data. In contrast, the prior art loses about seventeen macroblocks on the average, and can lose as many as thirty-three macroblocks. The data loss avoided in the first embodiment Leads to particularly large improvements in picture quality when motion-compensation and inter-frame prediction are performed, because it reduces the amount of error propagated into succeeding frames.

Next a second embodiment will be described. Like the first embodiment, the second embodiment is based on the codec structure and hierarchical data structure shown in FIGS. 1 and 2. Differing from the prior art and the first embodiment, the second embodiment does not encode macroblock addresses, but instead supplies a coded macroblock flag (COD) for each macroblock.

Figure 13:
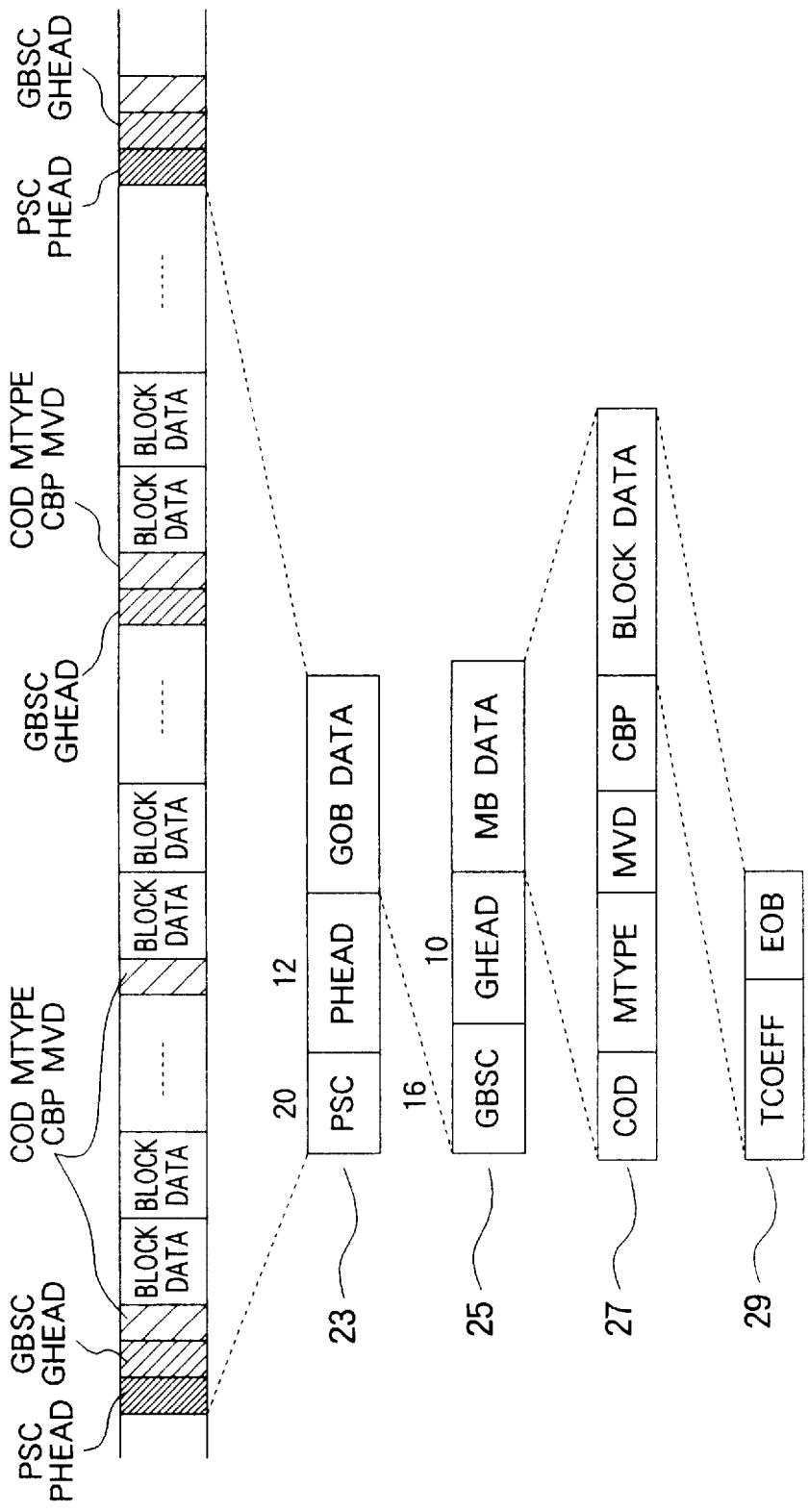
FIG. 13 illustrates the general structure of the coded data stream in a second embodiment of the invention.

FIG. 13 shows the general structure of the data stream output from the video multiplex coder 7 in the second embodiment. The picture layer 23, GOB layer 25, and block layer 29 are identical to the corresponding layers in the prior art. No ending macroblock address is added to the GOB layer 25 as in the first embodiment. The macroblock layer 27 begins with the coded macroblock flag COD noted above, and omits both the MBA and MQUANT items of the first embodiment and prior art.

FIG. 14 shows the coding syntax. A detailed description will be omitted, except to point out that every macroblock layer 27 starts with a coded macroblock flag COD, regardless of whether the macroblock contains any coded data or not. Every group of blocks accordingly contains thirty-three COD codewords. Macroblock addresses can be obtained by counting these COD codewords.

FIG. 15 shows part of the variable-length coding table employed in the second embodiment. As in the first embodiment, a single, self-resynchronizing, variable-length code is used, with separate codewords for each value of each data item. The first two codewords are the two values of the COD flag: a zero value (coded as "1") indicates a macroblock having no coded data present other than the COD codeword itself; a one value (coded as "011") indicates a macroblock having other coded data present (MTYPE and at least one other item).

The coding process in the second embodiment is generally similar to the coding process in the first embodiment, except that no macroblock addresses are encoded. Instead, one COD codeword is inserted in the data stream at the beginning of each macroblock. If there are no other data pertaining to the macroblock, the COD codeword is "1" and this single bit constitutes the entire coding of the macroblock. If there are other data pertaining to the macroblock, the COD codeword is "011" and is followed by other codewords. As in the first embodiment, all macroblocks in a group of blocks are quantized with the same step size, which is indicated in the GOB header.

The decoding process is al so generally similar to the decoding process of the first embodiment, and follows the flowchart in FIG. 10. The procedure for decoding the data stored in the GOB memory (step A7) differs, however, and will be described below. In the description, MBA(i) will again denote an absolute macroblock address.

Figure 16:
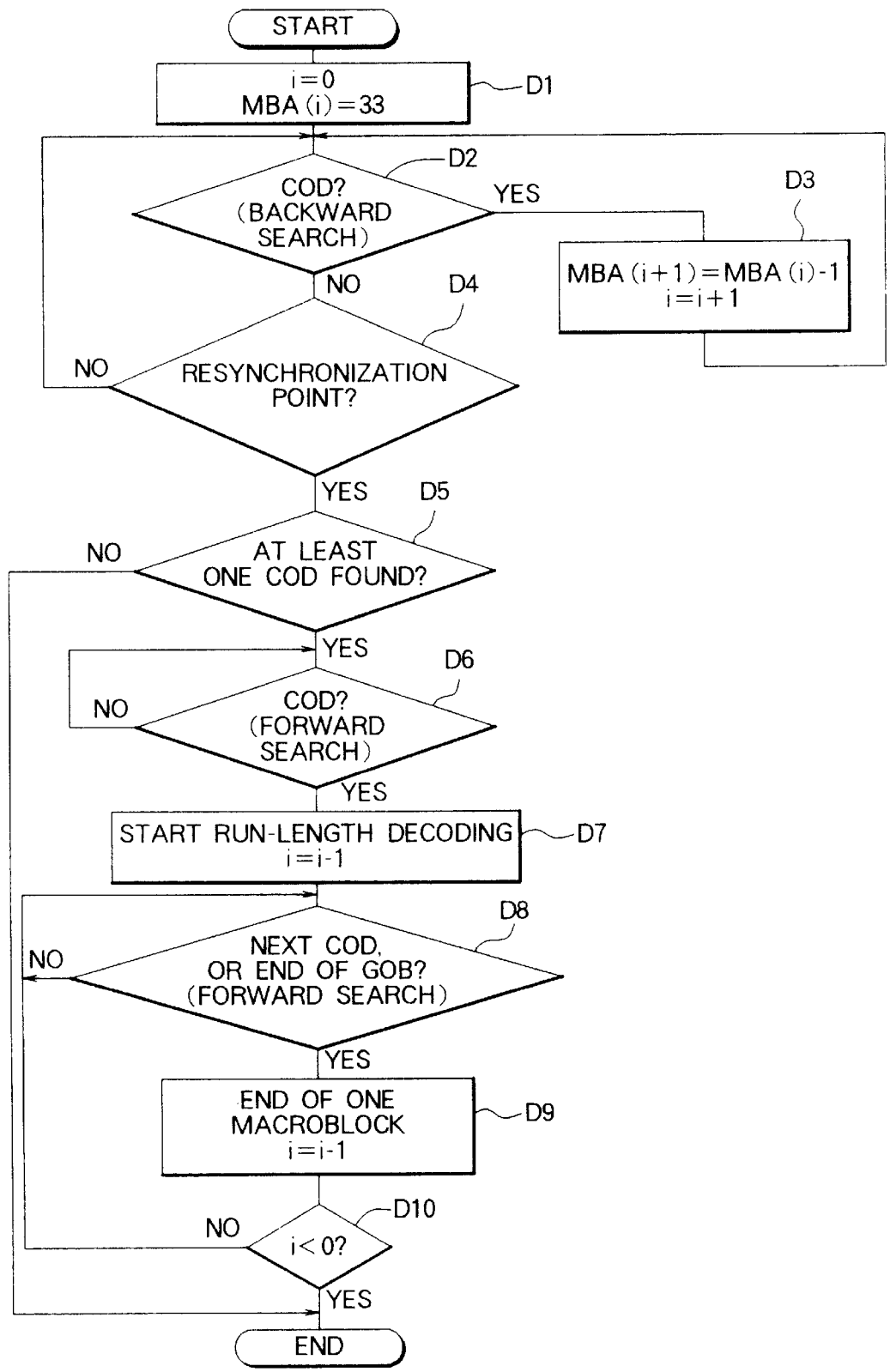
FIG. 16 is a flowchart of the decoding of memory contents in the second embodiment.

Referring to FIG. 16, the decoding of the data in the GOB memory comprises steps D1 to D10. In step D1, a parameter i is set to zero, and MBA(i), which is MBA(0), is set to thirty-three, denoting the last macroblock in the group of blocks.

Next the codewords are examined one by one, starting from the last codeword stored in the GOB memory and proceeding in the backward direction, searching for a COD codeword (step D2).

When a COD codeword is found, the value MBA(i)−1 is assigned to MBA(i+1), then the parameter i is incremented by one (step D3). This is followed by a return to step D2 to search for the next COD codeword in the backward direction.

If the codeword examined in step D2 is not a COD codeword, and if the resynchronization point has not yet been reached, step D2 is repeated. The backward search ends at the resynchronization point (step D4).

If the resynchronization point is reached without the discovery of any COD codeword, the decoding process for this group of blocks ends (step D5).

If any COD codeword has been found, the decoder 17 reverses direction and starts searching forward from the resynchronization point for the first COD codeword (step D6).

When this first COD codeword is reached, the decoder 17 decrements the parameter i by one and starts variable-length and run-Length decoding, working forward toward the end of the group of blocks (step D7).

As each variable-length codeword is decoded, it is checked to see whether it is either a COD codeword, or the last data stored in the GOB memory (step D8). If it is neither of these, the next codeword is decoded.

When a COD codeword or the end of the data in the GOB memory is reached, the decoder 17 assigns the data decoded since the preceding COD codeword as the data for the macroblock with address MBA(i), then decrements the parameter i by one (step D9). If the preceding (COD) codeword was "1," indicating a macroblock with no data, the decoder 17 simply decrements parameter i by one.

If the parameter i is now negative, the GOB memory is initialized and multiplex decoding of the group of blocks ends (step D10). Otherwise, a return is made to step D8 to decode the next macroblock.

The second embodiment provides the same effect as the first. Since a very short (one-bit) codeword is used to flag macroblocks with no data, the insertion of these flag codewords in the data stream has only a minor effect on the overall bit rate.

Next a third embodiment will be described. Like the first two embodiments, the third embodiment is based on the codec and hierarchical data structures shown in FIGS. 1 and 2. Differing from the prior art and the first two embodiments, the third embodiment does not encode macroblock addresses or employ coded macroblock flags, but instead supplies an end-of-macroblock codeword EOMB for each macroblock, indicating termination of the information pertaining to the macroblock.

Figure 17:
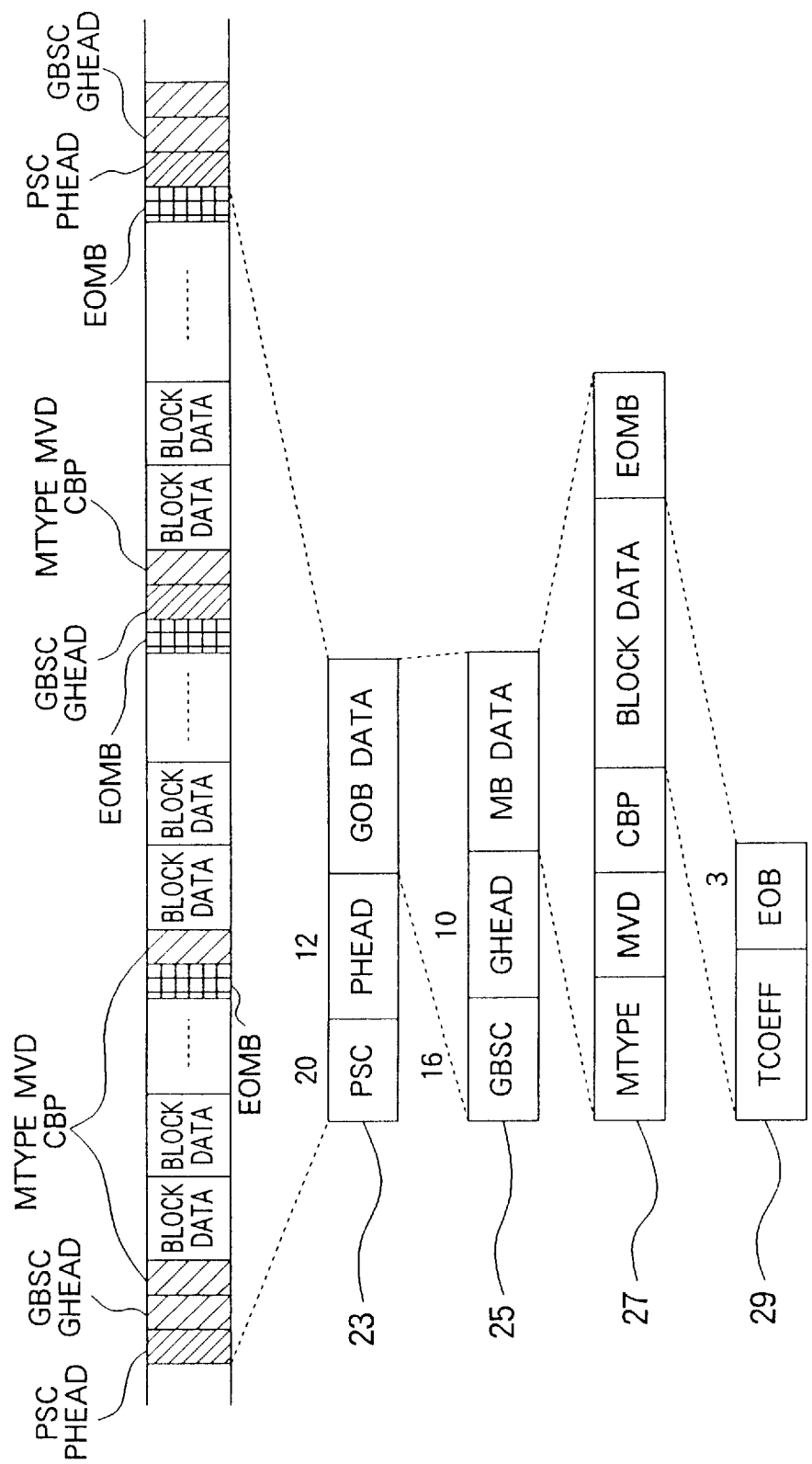
FIG. 17 illustrates the general structure of the coded data stream in a third embodiment of the invention.

FIG. 17 shows the general structure of the data stream output from the video multiplex coder 7 in the third embodiment. The picture layer 23, GOB layer 25, and block layer 29 are again identical to the corresponding layers in the prior art. The macroblock layer 27 has no MQUANT or MBA items, but ends with an end-of-macroblock codeword (EOMB).

Figure 18:
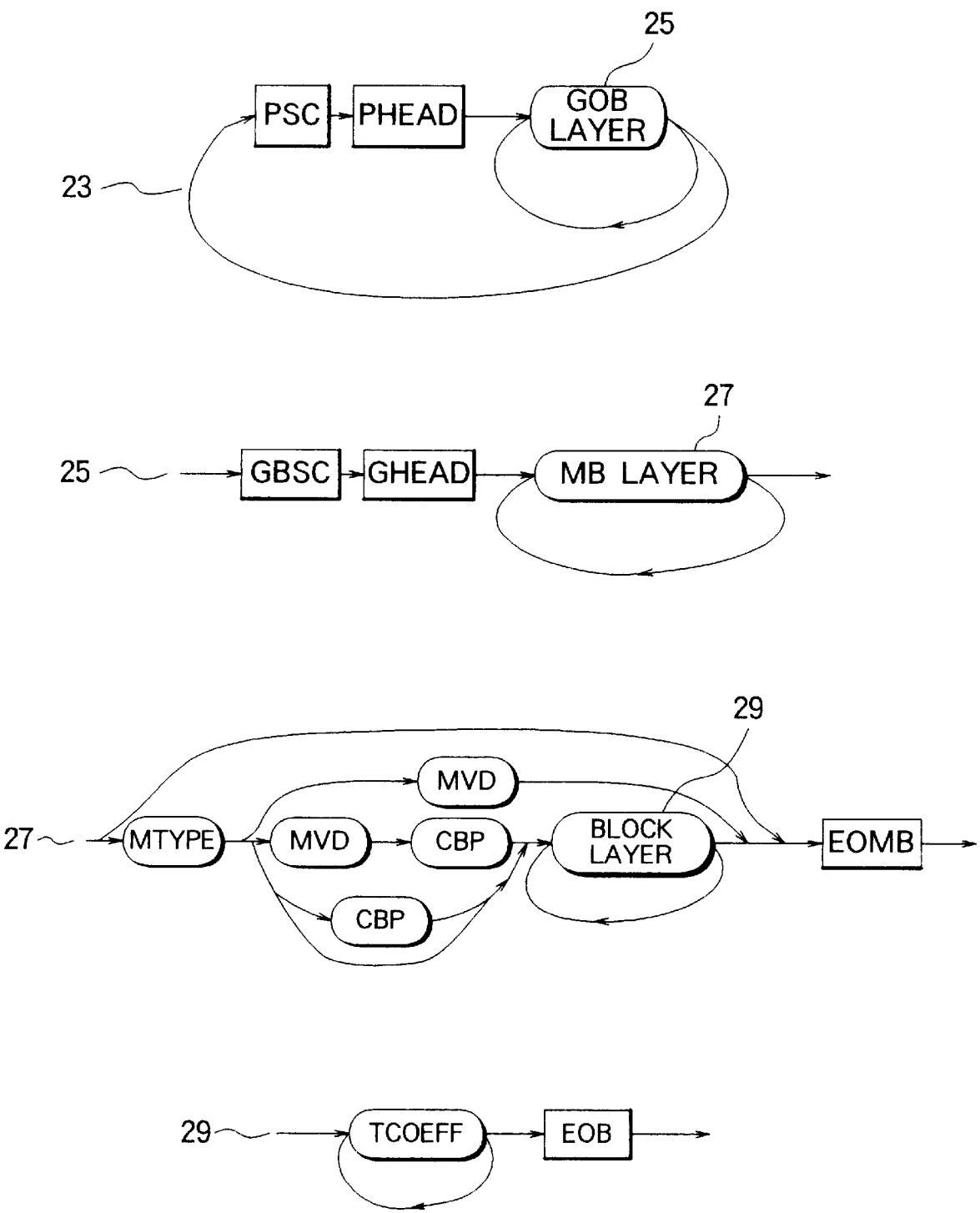
FIG. 18 illustrates the video multiplex coding syntax in the third embodiment.

FIG. 18 shows the coding syntax. A detailed description will again be omitted, except to mention that every macroblock layer 27 ends with an EOMB codeword, even if there are no preceding data in the macroblock. Every group of blocks accordingly contains thirty-three EOMB codewords, and macroblock addresses can be obtained by counting these EOMB codewords.

FIG. 19 shows the variable-length coding table of the third embodiment. A single, self-resynchronizing, variable-length code is used as in the first two embodiments, but most of the codewords now have several meanings. Codeword "110," for example, indicates the end of a block (EOB) when it appears in the block layer, but indicates the inter macroblock type (without motion vector data) when it appears at the beginning of a macrobock header. It is also used to indicate the "111100" coded block pattern (CBP), and zero motion vector data (MVD). The multiple usage of codewords shortens the average codeword length.

This multiple usage of codewords does not mean that different variable-length items have different coding rules, but rather that different items share the same coding rule. Despite the different meanings of the codewords, the rule for determining the boundaries between codewords is the same for all items.

Three codewords are not shared, but have unique meanings. One of these is the EOMB codeword that indicates the end of a macroblock. The other two are escape codes ESC and ESCDC, which are used to mark fixed-length coding in the TCOEFF data.

In the MTYPE entries in the coding table, "INTER+FIL" indicates an inter macroblock to which the loop filter was applied in the prediction process. The items present in each type of macroblock are indicated in parentheses following the notation INTRA, INTER, or INTER+FIL.

Coding in the third embodiment is generally similar to coding in the first and second embodiments. All macroblocks in a group of blocks are quantized with the same step size as before. Every macroblock ends with an EOMB codeword as noted above. Usage of the escape codes is as follows.

The ESCDC codeword is inserted in the data stream before the dc coefficient of an intra block. The dc coefficient is then coded using a fixed-length code, instead of a codeword from FIG. 19. This is advantageous because the dc coefficient of an intra block has no particular tendency to assume small values. Also, the dc coefficient is never preceded by a run of zeros, because it is the first transform coefficient in the block data.

Incidentally, although the prior art also codes the dc coefficient of an intra block as fixed-length data, it does not insert an escape code. As a result, when an error occurs, these fixed-length dc coefficients become an obstacle to resynchronization. The prior-art decoder may be unable to identify them as fixed-length codewords, and may attempt to decode them by a variable-length coding rule. The ESCDC codeword of the third embodiment can prevent this decoding mistake.

The ESC codeword is inserted before fixed-length coding of zero-run-length and level combinations that do not appear in the coding table in FIG. 19. A similar escape codeword is used for the same purpose in the prior art.

Use of the ESC and ESCDC codes means that the coding table does not have to provide codewords for rarely-occurring TCOEFF data, or for the many possible values of the dc coefficients in intra blocks. This permits a simplification of the coding rule and a shortening of the maximum codeword length.

Decoding in the third embodiment is generally similar to decoding in the first two embodiments, and follows the flowchart in FIG. 10. In step A1, if the video multiplex decoder 17 recognizes an escape codeword (ESC or ESCDC) during variable-length decoding, it suspends variable-length decoding temporarily, decodes one fixed-length TCOEFF item following the escape codeword, then resumes variable-length decoding.

When an error occurs, the decoding of the data stored in the GOB memory (step A7) differs in several respects from the processing in the first two embodiments. This decoding process now consists of steps E1 to E8 in FIG. 20, and will be described below. As before, MBA(i) denotes an absolute macroblock address.

In step E1, a parameter i is set to zero, and the value thirty-four is assigned as MBA(i), or MBA(0). This is a dummy value, being one greater than the number of macroblocks in the group of blocks.

Next the codewords are examined one by one, starting from the last codeword stored in the GOB memory and proceeding in the backward direction toward the resynchronization point, searching for EOMB codewords (step E2). The last codeword stored in the GOB memory is normally an EOMB codeword, so the first time the search is made, it succeeds immediately.

If the current codeword is not an EOMB, and if the resynchronization point has not been reached, step E1 is repeated to examine the next preceding codeword. If the resynchronization point has been reached, the decoding process ends (step E8).

When an EOMB codeword is found, MBA(i)−1 is assigned as the value of MBA(i+1) (step E3). The first time this step is performed, for example, thirty-three is assigned as MBA(1).

Next, the codewords between the current EOMB and the EOMB found previously are decoded, thereby decoding one macroblock (step F4). Decoding of the macroblock proceeds in the forward direction, away from the resynchronization point and toward the end of the GOB memory. The first time this step is performed, the current EOMB codeword is the last codeword in the GOB memory, so there is nothing to decode. Similarly, when one EOMB is followed immediately by another EOMB, there is nothing to decode between the two EOMBs.

Next, a decision is made as to whether decoding was successful (step E5). The criteria are the same as in step A2 in FIG. 10. If there was nothing to decode, decoding is automatically considered successful. If decoding was unsuccessful, the decoding of GOB memory contents ends.

If decoding was successful, the decoded data are assigned as the data of macroblock MBA(i) (step E6). If there was nothing to decode, no data are assigned. For example, no data are assigned to the initial macroblock MBA(0) having dummy address thirty-four.

Next the parameter i is incremented by one and a return is made to step E2 to decode another macroblock.

Figure 20:
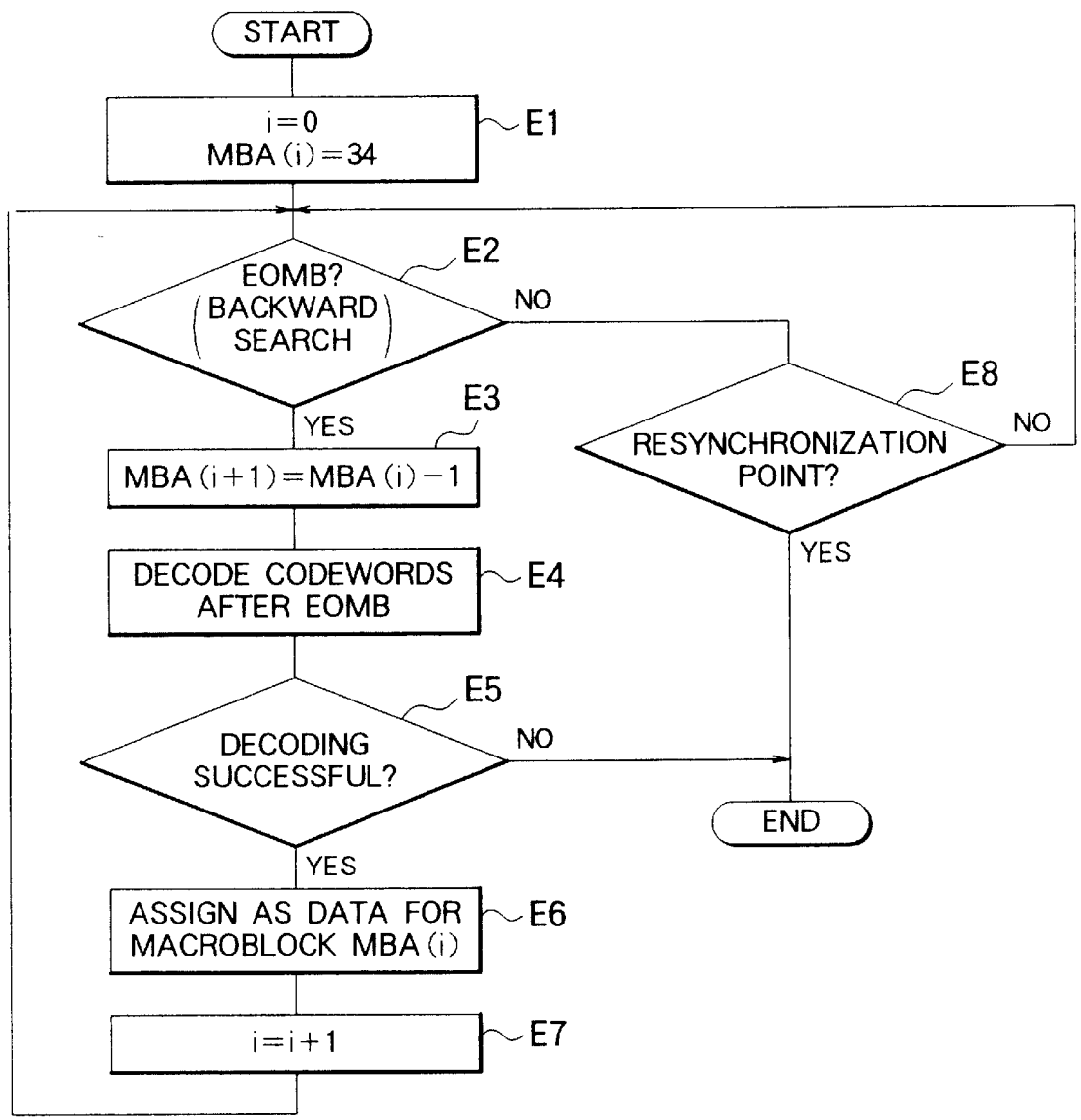
FIG. 20 is a flowchart of the decoding of memory contents in the third embodiment.

The processing in FIG. 20 continues until ended either by an error in step E5, or by the encountering of the resynchronization point in step E8.

Figure 21:
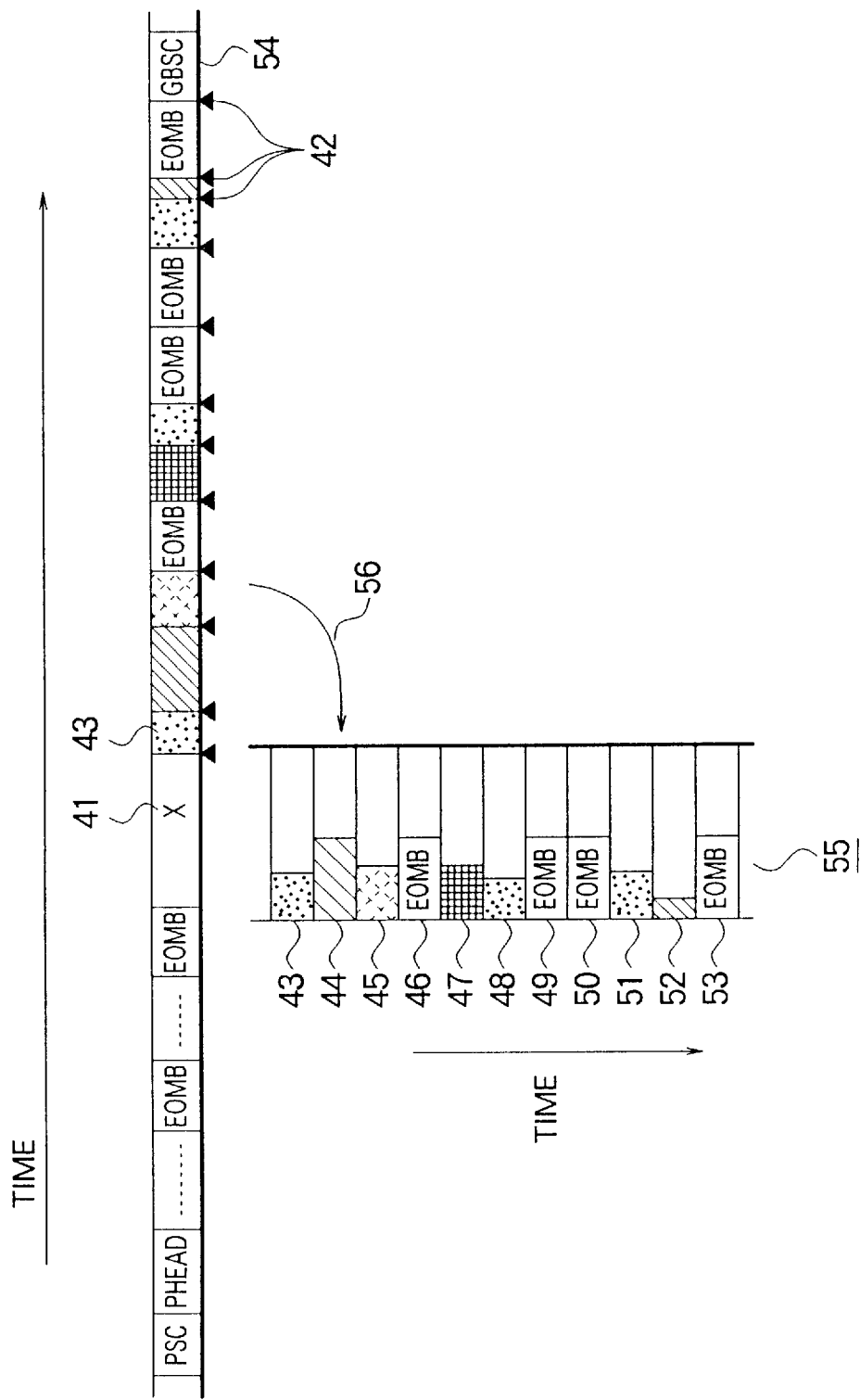
FIG. 21 illustrates the storage of codewords in memory following resynchronization in the third embodiment.

FIG. 21 illustrates the processing when an error 41 occurs in the third embodiment, showing the data stored in the GOB memory. The black triangles 42 indicate boundaries between variable-length codewords. Resynchronization occurs at a codeword 43 following the error 41. The codewords 43 to 53 from the resynchronization point up to just before the next start code 54 are stored in the GOB memory 55 as indicated by arrow 56. These codewords 43 to 53 are in general variable-length codewords, but some may be fixed-length codewords, if there is a preceding escape codeword. As shown, each codeword is stored at a separate address.

Upon encountering the start code 54, the decoder 17 assigns thirty-four as an initial (dummy) macroblock address, and begins working backward from codeword 53 to codeword 43 in the GOB memory 55, looking for EOMB codewords.

Codeword 53 is an EOMB codeword, but there is no data to decode after this codeword, so the decoder 17 simply assigns thirty-three as the next macroblock address.

Codeword 50 is the next EOMB codeword encountered. Here the decoder 17 decodes successfully codewords 51 and 52 and assigns the decoded data to macroblock address thirty-three, the last macroblock in the group of blocks. Then it assigns thirty-two as the next macroblock address.

Another EOMB codeword 49 is now encountered immediately. Since there are no codewords between EOMB codewords 49 and 50, no data are assigned to macroblock address thirty-two, and thirty-one is assigned as the next macroblock address.

The next EOMB codeword is codeword 46. At this point the decoder decodes codewords 47 and 48 and, if successful, assigns the decoded data to macroblock address thirty-one.

Proceeding further backward, the decoder encounters the resynchronization point at codeword 43 without finding another EOMB codeword, so it stops decoding the GOB memory contents, having decoded macroblocks thirty-one and thirty-three (and the empty macroblock thirty-two).

One of the advantages of the third embodiment has already been pointed out: the assignment of multiple meanings to codewords, and the use of escape codes, permits a general shortening of the maximum variable-length codeword length. A consequent second advantage is that less GOB memory 55 is required. A third advantage is that short variable-length codewords promote rapid recovery of synchronization.

A fourth advantage is that, since the decoder 17 checks for errors while decoding the data in the GOB memory 55, it need not check the coding syntax during the resynchronization process. Resynchronization can be assumed as soon as a legal codeword is detected. If resynchronization is recognized prematurely and erroneous codewords are stored in the GOB memory 55, the error will be discovered during the decoding of the data in the GOB memory 55, and the erroneous data will be discarded with no damage to picture quality.

Next a fourth embodiment, also based on the codec and hierarchical data structures shown in FIGS. 1 and 2, will be described. The fourth embodiment includes features of the second and third embodiments, and adds new features, particularly in regard to the data sequence in the GOB and macroblock layers 25 and 27.

Figure 22:
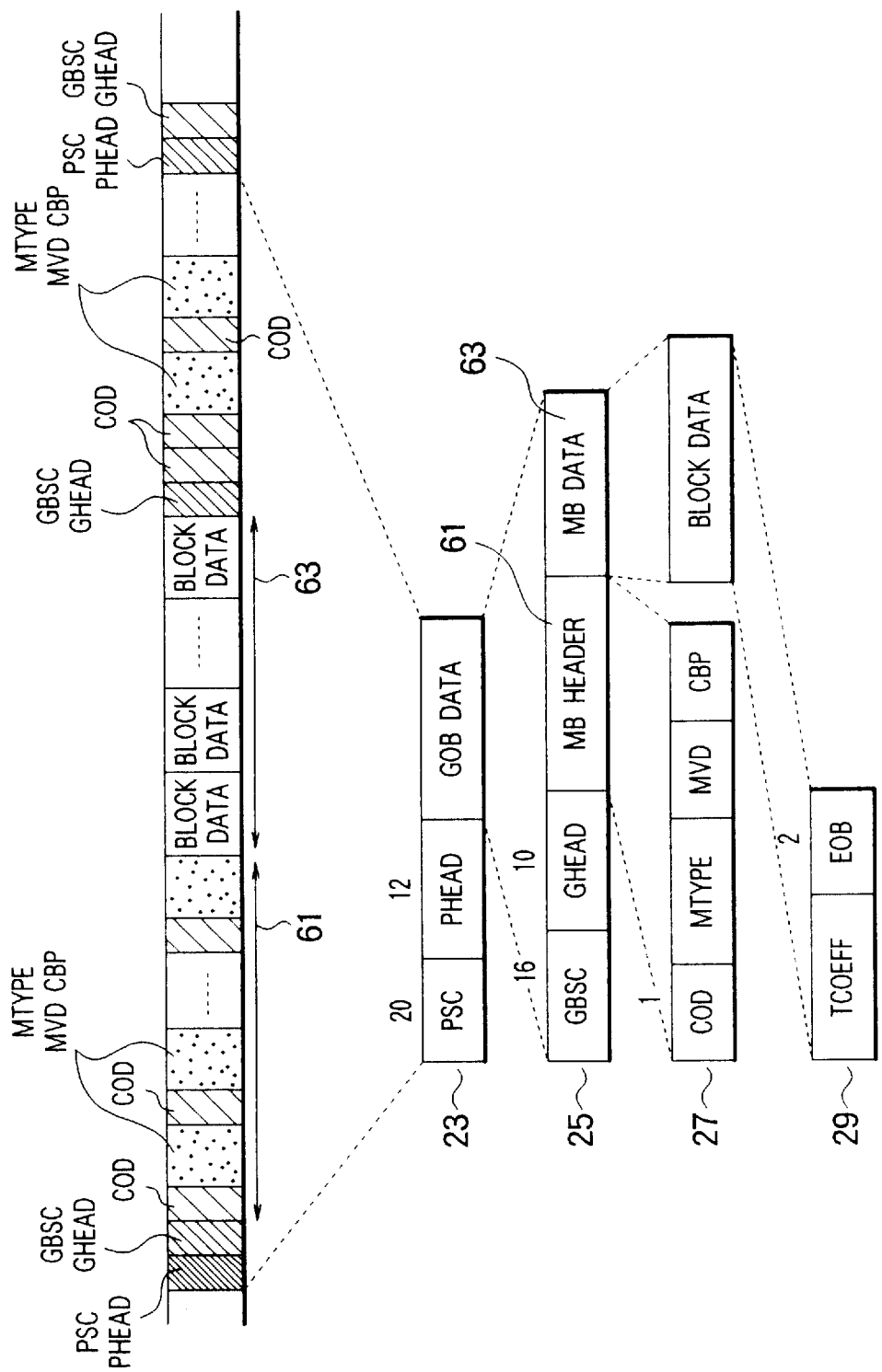
FIG. 22 illustrates the general structure of the coded data stream in a fourth embodiment of the invention.

FIG. 22 shows the general structure of the data stream output from the video multiplex coder 7 in the fourth embodiment. The macroblock header information comprises a one-bit coded macroblock flag COD and the conventional MTYPE, MVD, and CBP items. The MQUANT item is omitted. A major difference from the preceding embodiments is that within the GOB layer 25, all of the macroblock header information is grouped into a single macroblock header sublayer 61, followed by a macroblock data sublayer 63 containing all of the block data.

The macroblock header sublayer 61 and macroblock data sublayer 63 are organized with their macroblock addresses running in reverse directions. If the macroblock data sublayer 63 is organized in ascending order of macroblock addresses, for example, then the macroblock header sublayer 61 is organized in descending order of macroblock addresses. This sequence will be assumed in the following explanation, but other sequences are also possible, e.g. the macroblock data sublayer 63 can be organized in descending macroblock address order, and the macroblock header sublayer 61 in ascending macroblock address order.

Figure 23:
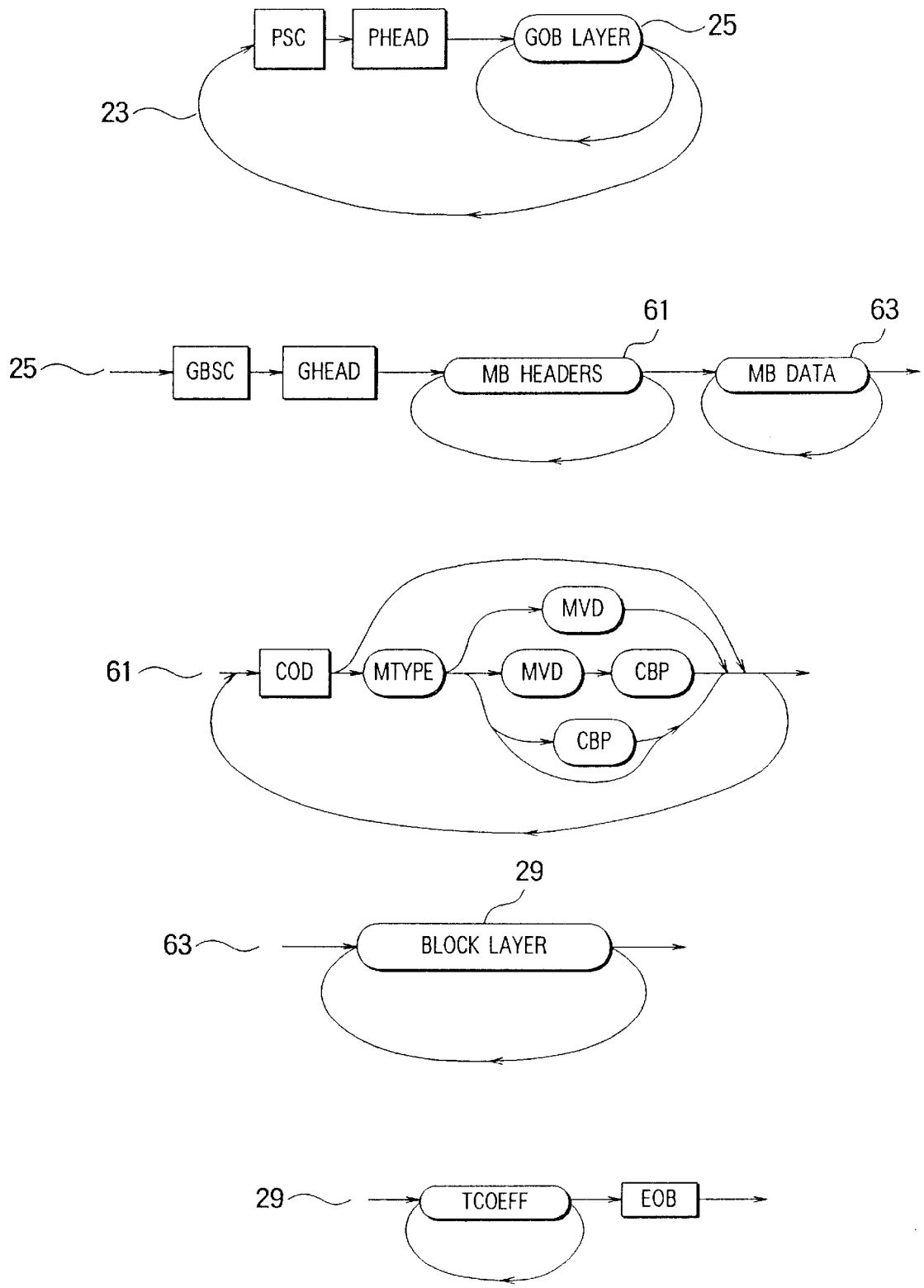
FIG. 23 illustrates the video multiplex coding syntax in the fourth embodiment.

FIG. 23 shows the coding syntax. On the GOB layer 25, the macroblock header sublayer 61 is repeated thirty-three times (once for every macroblock), followed by repetitions of the macroblock data sublayer 63 for those macroblocks actually containing transform coefficient data.

The macroblock header sublayer 61 begins with a one-bit fixed-length coded macroblock flag COD. If the COD bit has the value "one," the macroblock contains no other data and the rest of the macroblock header items (MTYPE, MVD, and CBP) are omitted. If the COD bit has the value "zero," the MTYPE item is coded, followed by one, both, or neither of the MVD and CBP items, depending on the macroblock type.

The macroblock data sublayer 63 consists of repetitions of the block sublayer for those blocks in the macroblock having at least one non-zero transform coefficient.

FIG. 24 shows the variable-Length coding table of the fourth embodiment. Symbols such as "+FIL" have the same meanings as in FIG. 19. As in the third embodiment, the same codewords are used to encode the TCOEFF, MTYPE, CBP, and MVD items. Escape codewords ESC and ESCDC are again provided. ESC has a unique meaning, but the ESCDC codeword "10" is also the the end-of-block code EOB.

Except for the splitting of the macroblock layer into macroblock header and data sublayers 61 and 63, the reverse macroblock address sequences in these two sublayers, and the insertion of a COD bit at the beginning of every macroblock header instead of an EOMB codeword at the end of every macroblock, coding in the fourth embodiment is similar to coding in the third embodiment. All macroblocks in a group of blocks are quantized with the same step size. The escape codewords are used in the same way as in the third embodiment.

The decoding process is also generally similar to the third embodiment, and generally follows the flowchart in FIG. 10. In step A1, however, the entire macroblock header sublayer 61 is stored in the GOB memory. Then in decoding the macroblock data sublayer 63 in step A1, the decoder 17 refers to the stored macroblock header information to determine which data blocks are present.

If an error is recognized in step A2 in FIG. 10, the decoder 17 stops decoding and proceeds to resynchronize as in step A3. When resynchronization is achieved, the decoder 17 stores the codewords from the resynchronization point up to the next start code in the GOB memory (steps A5 and A6), then decodes as much of the stored data as possible (step A7), working backward from the start code toward the resynchronization point. All successfully decoded data are output to the source decoder 15 (step A8).

Figure 25:
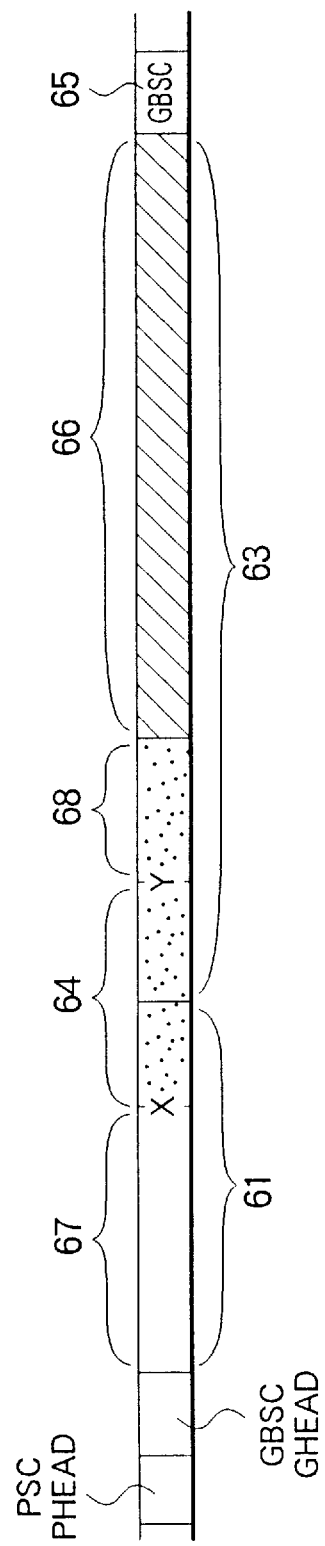
FIG. 25 illustrates data loss due to an error in the fourth embodiment.

FIG. 25 shows an example in which an error is recognized at a point X in the macroblock header sublayer 61. Resynchronization is achieved at a point Y in the macroblock data sublayer 63. The data 64 between points X and Y are accordingly lost. After storing the data from point Y up to the next start code (GBSC) 65 in the GOB memory, the decoder 71 works backwards and decodes block data 66, referring to the corresponding header information 67 that was stored in the GOB memory before the error occurred. A certain amount of block data 68 cannot be decoded because they correspond to macroblock header information that was lost following the error at X.

FIG. 25 illustrates the reason for coding the macroblock headers and block data in reverse order of macroblock addresses. If the macroblock headers and block data were coded in the same order, the loss of data 64 would make it impossible to decode macroblocks at both ends of the macroblock address sequence: at one end because the header information is missing; and at the other end because the block data are missing. With the coding scheme adopted in the fourth embodiment, macroblocks are lost at only one end of the macroblock address sequence (the low end, if the block data are in ascending order and the headers in descending order).

When an error occurs in the macroblock header sublayer 61 as in FIG. 25, the presence of the COD bits, which do not conform to the variable-length coding rule, makes it substantially impossible to resynchronize until the macroblock data sublayer 63 is reached. Despite this, the fourth embodiment still loses less data due to errors than does the prior art, which in FIG. 25 would discard all data from point X up to the next start code 65.

Figure 26:
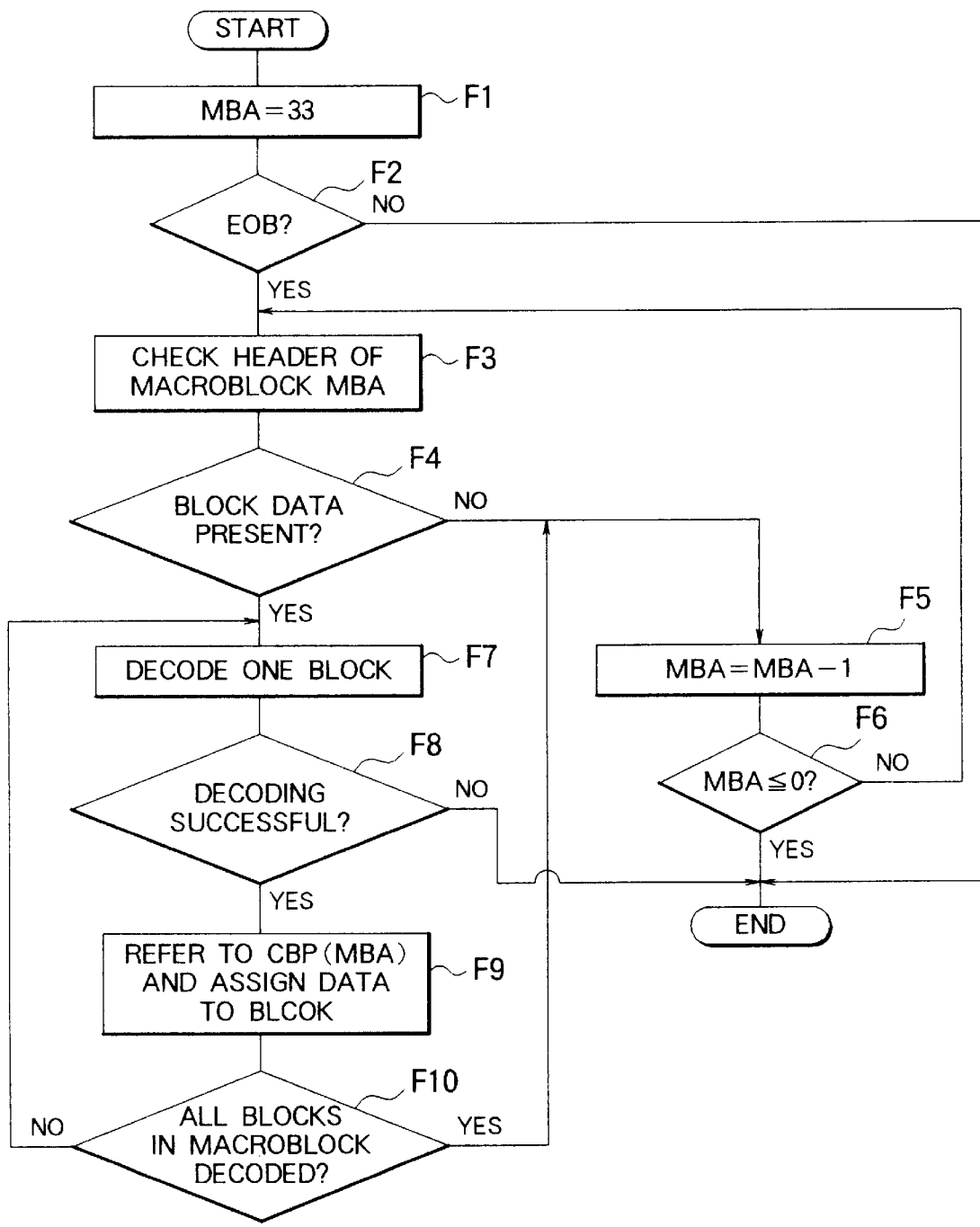
FIG. 26 is a flowchart of the decoding of memory contents in the fourth embodiment.

FIG. 26 shows the processing of step A7 for the case in FIG. 25. In the description of this processing, the symbol MBA represents an absolute macroblock address, i.e. an integer from one to thirty-three. COD(MBA), MTYPE (MBA), and CBP(MBA) represent the COD bit, macroblock type information, and coded block pattern of the macroblock at address MBA.

In the first step in FIG. 26, the macroblock address MBA is initialized to thirty-three, representing the last macroblock in the group of blocks (step F1).

Next, the last codeword stored in the GOB memory is checked. If this codeword is not an end-of-block codeword (EOB), then presumably no block data have been stored in the GOB memory, so there is nothing to decode and the process ends (step F2).

if the last codeword is an EOB codeword, the macroblock header information stored in the GOB memory for macroblock address MBA is checked (step F3).

From the COD(MBA) and MTYPE(MBA) values in the header, the decoder 17 determines whether any block data have been stored for macroblock address MBA (step F4). If the header information was damaged due to the error, the decision is that no block data are present.

If no block data are present for block MBA, the value of MBA is decremented by one (step F5).

If the MBA value is now zero or less, the GOB memory is initialized and the decoding of its contents ends (step F6). If the MBA value is greater than zero, a return is made to step F3 to check the next macroblock header. This loop continues until a macroblock with block data present is found.

When this macroblock is found, the decoder searches backward for the preceding EOB codeword and attempts to decode one block of transform coefficient data following that preceding EOB codeword (step F7).

If the attempted decoding is unsuccessful, owing to damage in either the header information or block data, the GOB memory is initialized and the decoding of its contents ends (step F8).

If decoding was successful, the coded block pattern CBP(MBA) is referenced to determine which block in the macroblock the data belongs to, and the decoded data are assigned to that block (step F9).

From the coded block pattern the decoder 17 also determines whether the macroblock has any further block data to be decoded. If it does, a return is made to step F7 to decode the next preceding block. If it does not, a transition is made to step F5 to find the next macroblock with block data to be decoded.

The process depicted in FIG. 26 continues until terminated by unsuccessful decoding in step F8, or until all block data have been decoded, as determined in step F6.

Figure 27:
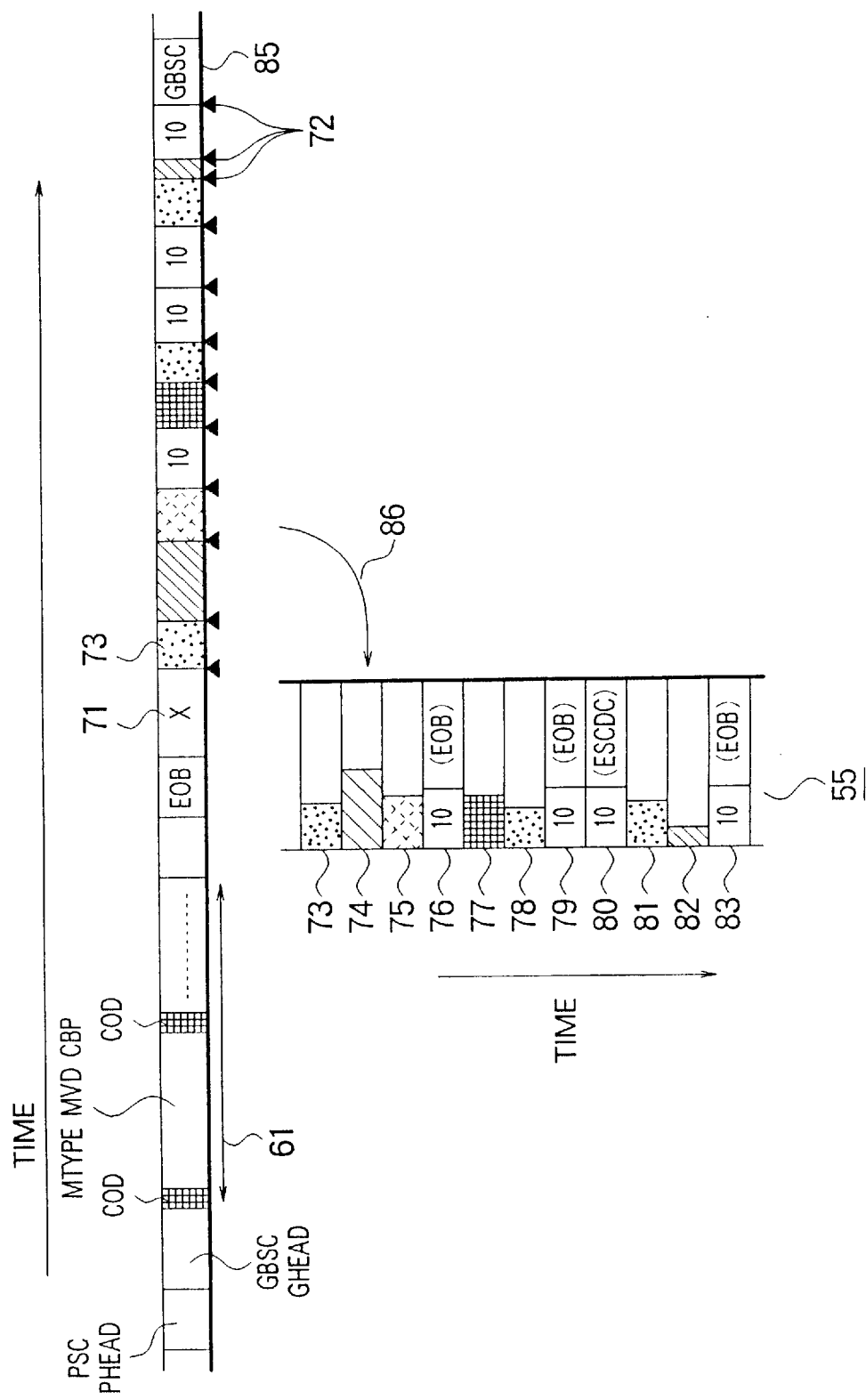
FIG. 27 illustrates the storage of codewords in memory following resynchronization in the fourth embodiment.

FIG. 27 illustrates a case in which an error 71 occurs in the macroblock data sublayer. All information in the macroblock header sublayer 61 is correct. Resynchronization occurs at codeword 73, and codewords 73 to 83 are stored in the GOB memory 55, up to just before the next start code 85, as indicated by arrow 86. The last codeword 83 is an EOB codeword, having binary value "10." In this example, purely for illustrative purposes, the last macroblock with any block data is assumed to be an intra macroblock with just one coded block. (Actually, an intra macroblock always has six coded blocks.) The decoder 17 learns from the macroblock header information that this macroblock is an intra macroblock. In searching backward from codeword 83, the decoder 17 accordingly knows that the next "10" codeword will be an ESCDC codeword, so it correctly identifies codeword 80 as this ESCDC codeword and codeword 79 as the preceding EOB codeword. The block between EOB codewords 79 and 83 has one fixed-length codeword 81 representing the dc coefficient of the block, and one variable-length codeword 82 representing a run-length and level combination.

After decoding this block, the decoder 17 finds the next preceding EOB codeword 76 and decodes the block data represented by variable-length codewords 77 and 78.

Decoding of the next preceding block is unsuccessful, because the resynchronization point at codeword 73 is encountered before another EOB codeword is found. Decoding of the GOB memory contents ends at this point.

Incidentally, even without knowing the macroblock type, the decoder can never confuse the ESCDC and EOB codewords, because ESCDC is always preceded by EOB, and EOB is never followed immediately by another EOB. When two consecutive "10" codewords occur, the first must therefore by an EOB and the second an ESCDC. Isolated "10" codewords are always EOB.

The present invention is not restricted to the preceding embodiments. A few variations will be described next.

As a variation of the fourth embodiment, instead of using a single coding rule for all variable-length items, it is possible to use different coding rules for different items, as in the prior art, to shorten the average codeword length. If an error occurs, the decoder applies the block-data decoding rule, and resynchronization takes place in the macroblock data sublayer 63, as in FIG. 25. There is no disadvantage in this, because the fourth embodiment is normally unable to resynchronize in the macroblock header sublayer 61 anyway, due to the COD bits.

For the same reason, the macroblock headers in the fourth embodiment could include a fixed-length MQUANT item as in the prior art, permitting the use of different quantization step sizes in different macroblocks. Adjustment of the quantization step size can further shorten the length of the coded data stream.

Fixed-length coding could also be employed for any of the other header items in the fourth embodiment, including MTYPE, MVD, and CBP. An advantage of the fourth embodiment is that it enables synchronization to be recovered in the block data regardless of the way in which the header information is coded.

The first and second embodiments can employ coding tables like the ones in FIGS. 19 and 24, using the same codewords with different meanings for two or more items. The first and second embodiments can also employ escape codes to permit fixed-length coding of uncommon TCOEFF combinations, or of dc coefficients in intra macroblocks.

Conversely, the third and fourth embodiments could employ coding tables like the ones in FIGS. 9 and 15, in which each codeword belongs to only one item and has only one meaning. These tables can also include escape codes to permit the use of fixed-length codewords as above.

Differential coding can be employed for the motion vector data (MVD). In this case the absolute value of the last coded motion vector data should be added to the coding syntax of the GOB layer 25, in the same way that EMBA was added in the first embodiment, to permit reconstruction of MVD values following an error.

For monochrome video signals, the distinction between blocks and macroblocks is unnecessary, so the hierarchical data structure requires only three levels, instead of the four shown in FIG. 2.

More generally, the invention can be practiced with any hierarchical data structure that divides a picture into a plurality of picture areas, organizes these areas into one or more groups, and provides a start code for each group.

Source coding is not restricted to use of the discrete cosine transform and other methods mentioned above. Any source coding method that produces a series of at least two types of digital information items may be employed.

Those skilled in the art will realize that various further modifications can be made within the scope claimed below.

What is claimed is:

1. A method of coding a source signal representing a moving picture, comprising the steps of:
   (a) generating a series of digital information items of at least three different types from said source signal, said different types of digital information item indicating information about the moving picture;
   (b) coding the digital information items of at least one of said types according to at least one fixed-length coding rule, thereby generating fixed-length codewords; and
   (c) coding the digital information items of all other of said types, comprising at least two of said types, according to a single, self-resynchronizing, variable-length coding rule, thereby generating variable-length codewords.

2. The method of claim 1, wherein each codeword among said variable-length codewords has a unique meaning.

3. The method of claim 1, wherein at least one codeword among said variable-length codewords has at least two different meanings, said different meanings applying to items of different types among said types.

4. The method of claim 1, wherein said variable-length coding rule includes an escape codeword that is placed before certain fixed-length codewords.

5. The method of claim 4, wherein one of the types of items coded in said step (b) is a coefficient describing an average signal level of an area in said moving picture, without relation to previous average signal levels of said area, and said step (c) comprises generating an escape codeword that is placed before said coefficient.

6. The method of claim 1, wherein said source signal consists of parts representing different picture areas, said picture areas are organized into groups, and for each group among said groups, said step (c) comprises:
   generating a first address codeword representing an absolute position, within said group, of a first picture area for which other codewords are also generated;
   generating differential address codewords for all other picture areas, in said group, for which other codewords are also generated, said differential address codewords representing differences between positions of respective picture areas; and
   generating an ending address codeword representing an absolute position, within said group, of a last picture area for which other codewords are also generated.

7. The method of claim 1, wherein said source signal consists of parts representing different picture areas, and for each picture area among said picture areas, said step (c) comprises generating a flag codeword indicating whether any codewords pertaining to said picture area, other than said flag codeword, are present among said fixed-length codewords and said variable-length codewords.

8. The method of claim 1, wherein said source signal consists of parts representing different picture areas, and for each picture area among said picture areas, said step (c) comprises generating an ending codeword for said picture area, regardless of whether any other codewords pertaining to said picture area are present among said fixed-length codewords and said variable-length codewords.

9. A method of coding a source signal representing a moving picture, said source signal having parts representing different picture areas and said picture areas being orginized into groups, said method comprising, for each group among said groups, the steps of:
   generating a start code for said group;
   generating, for each picture area in said group, header information designating a picture area type and designating whether coded picture data are present for said picture area, said picture area type indicating a coding format of said picture area;
   generating coded picture data for those picture areas designated in said header information as having coded picture data present, using a self-resynchronizing variable-length coding rule; and
   outputting said start code, followed by said header information for all picture areas in said group, then followed by said coded picture data.

10. The method of claim 9, wherein said header information is output in a first order of said picture areas in said group, and said coded picture data are output in a second order of said picture areas in said group, said first order being reverse to said second order.

11. The method of claim 9, wherein at least part of said header information is also coded according to said self-resynchronizing variable-length coding rule.

12. The method of claim 9, wherein said self-resynchronizing variable-length coding rule includes an escape codeword that is followed by a fixed-length codeword.

13. The method of claim 12 wherein, for a certain picture area type designated in said header information, said coded picture data comprises a fixed-length coefficient describing an average signal level of said picture area at one time, without relation to said signal level at a previous time, and said self-resynchronizing variable-length coding rule includes an escape codeword that is placed before said coefficient.

14. A method of decoding a coded signal containing both fixed-length and variable-length codewords, in which all of said variable-length codewords are coded according to a single self-resynchronizing coding rule, and in which, among said codewords, there are start codes that begin segments of said coded signal pertaining to respective groups of picture areas, comprising the steps of:
   detecting one start code among said start codes;
   decoding codewords following said one start code;
   checking for errors in the codewords thus decoded;
   attempting to resynchronize according to said signal self-resynchronizing coding rule, if an error is recognized;
   storing subsequent codewords in a memory until a next start code is detected when resynchronization occurs after an error; and decoding contents of said memory.

15. The method of claim 14, wherein among said variable-length codewords there are differential address codewords representing relative positions of picture areas in respective groups of picture areas, each of said segments has an ending address codeword representing an absolute position of a last picture area appearing in said segment, and said step of decoding contents of said memory comprises:

decoding said ending address codeword to obtain the absolute position of said last picture area;

searching backward in said memory for said differential address codewords;

decoding said differential address codewords to obtain decoded values; and using said absolute position and said decode values to obtain positions of corresponding picture areas.

16. The method of claim 14, wherein among said variable-length codewords there are flag codewords pertaining to respective picture areas, said flag codewords having one value for picture areas for which only said flag codewords are present in said coded signal, and another value for picture areas for which other codewords are also present in said coded signal, and said step of decoding contents of said memory comprises determining positions of picture areas by counting said flag codewords.

17. The method of claim 14, wherein among said variable-length codewords there are ending codewords, every picture area among said picture areas having one ending codeword regardless of whether any other codewords pertaining to said picture area are present in said coded signal, and said step of decoding contents of said memory comprises counting said ending codewords to determine positions of respective picture areas.

18. A method of decoding a coded signal containing start codes, header information, and coded picture data, each of said start codes being followed by header information pertaining to one group of picture areas and to individual picture areas in said group of picture areas, then by coded picture data pertaining to the same group of picture areas, and said coded picture data being coded according to a self-resynchronizing variable-length coding rule, said method comprising the steps of:

detecting one of said start codes;

decoding the header information following said one of said start codes;

storing the header information thus decoded in a memory;

decoding said coded picture data while referring to the header information stored in said memory;

checking for errors in the header information and coded picture data thus decoded;

attempting to resynchronize according to said variable-length coding rule, if an error is recognized;

storing subsequent coded picture data in said memory until a next start code is detected when resynchronization occurs after an error; and decoding the coded picture data stored in said memory while referring to the header information stored in said memory.

19. The method of claim 18, wherein the header information pertaining to said individual picture areas in said group of picture areas is decoded in a first order of said picture areas, and unless an error is recognized, said coded picture data are decoded in a second order of said picture areas, said first order being reverse to said second order.

20. The method of claim 18, wherein said coded picture data comprise both fixed-length codewords and variable-length codewords, among said variable-length codewords there are escape codewords, every fixed-length codeword in said coded picture data is preceded by one of said escape codewords, and said step of attempting to resynchronize comprises suspending said variable-length coding rule for one fixed-length codeword after one of said escape codewords is recognized.

21. The method of claim 20, wherein one of said escape codewords precedes a fixed-length codeword describing an average signal level of one of said picture areas at one time, without relation to said signal level at a previous time.

22. A video coder for coding a video signal representing a moving picture, comprising:

a source coder for receiving said video signal and generating a series of fixed-length digital information items of at least two different types, said different types of digital information items indicating information about the moving picture; and a video multiplex coder coupled to said source coder, for coding at least two of said different types of said digital information items according to a single self-resynchronizing variable-length coding rule.

23. The coder of claim 22, wherein one of said digital information items is a coefficient describing an average signal level of an area in said moving picture, without relation to previous average signal levels of solid area, and said video multiplex coder leaves said coefficient in a fixed-length form, but inserts an escape code conforming to said self-resynchronizing variable-length coding rule before said coefficient.

24. The coder of claim 22, wherein said video multiplex coder employs only one variable-length coding rule.

25. The coder of claim 24, wherein said video multiplex coder divides said moving picture into picture areas, organizes said picture areas into groups, uses said self-resynchronizing variable-length coding rule to code differential addresses representing relative positions of the picture areas in said groups, and uses said self-resynchronizing variable-length coding rule to code absolute addresses representing absolute positions of both first and last picture areas in respective groups.

26. The coder of claim 24, wherein said video multiplex coder divides said moving picture into picture areas, and uses said self-resynchronizing variable-length coding rule to code flag information having one value for picture areas for which said video multiplex coder also codes information other than said flag information, and another value for picture areas for which said video multiplex coder codes only said flag information.

27. The coder of claim 24, wherein said video multiplex coder divides said moving picture into picture areas, and uses said self-resynchronizing variable-length coding rule to code an ending code for each picture area among said picture areas, regardless of whether said picture area has any coded information other than said ending code.

28. The coder of claim 22, wherein said video multiplex coder divides said moving picture into groups of picture areas, generates a start code for each group of picture areas among said groups of picture areas, generates header information for each picture area in said group of picture areas, uses said self-resynchronizing variable-length coding rule to generate picture data for certain picture areas responsive to said header information, and outputs said start code, followed by said header information for all picture areas in said group of picture areas, then followed by said picture data.

29. The coder of claim 28, wherein said header information is output in a first order of said picture areas, and said coded picture data are output in a second order of said picture areas, said first order being reverse to said second order.

30. A video decoder for decoding a coded video signal representing a moving picture, said coded video signal being segmented by start codes, said video decoder comprising:

a video multiplex decoder having a memory, for detecting one of said start codes in said coded video signal, using a self-resynchronizing variable-length coding rule to decode at least part of said coded video signal following said start code, checking for errors, using said self-resynchronize variable-length coding rule to resynchronize following an error, storing said coded video signal in said memory after resynchronization until another one of said start codes is detected, and decoding contents of said memory after detection of said another one of said start codes; and a source decoder coupled to said video multiplex decoder, for receiving said video signal as decoded by said video multiplex decoder, and performing further decoding to generate a video signal.

31. The video decoder of claim 30, wherein said moving picture is divided into picture areas having addresses.

32. The video decoder of claim 31 wherein, in decoding said contents of said memory, said video multiplex decoder obtains said addresses by decoding an ending address, then searching backward in said memory, decoding differential addresses, and subtracting said differential addresses successively from said ending address.

33. The video decoder of claim 31 wherein, in decoding said contents of said memory, said video multiplex decoder obtains said addresses by counting flag codewords corresponding to respective picture areas, said flag codewords indicating whether other information pertaining to respective picture areas is present.

34. The video decoder of claim 31 wherein, in decoding said contents of said memory, said video multiplex decoder obtains said addresses by counting ending codewords corresponding to respective picture areas, said ending codewords indicating termination of information pertaining to respective picture areas.

35. The video decoder of claim 31 wherein:

in said coded video signal, said start code is followed by header information pertaining to a group of said picture areas, and to individual picture areas in said group of picture areas, then by picture data pertaining to said individual picture areas;

said video multiplex decoder stores said header information in said memory, even if no error is detected; and said video multiplex decoder refers to said header information in decoding said picture data.

* * * * *